United States Patent
Zhang et al.

(10) Patent No.: US 9,577,537 B2
(45) Date of Patent: *Feb. 21, 2017

(54) SYSTEMS AND METHODS FOR LOAD COMPENSATION WITH PRIMARY-SIDE SENSING AND REGULATION FOR FLYBACK POWER CONVERTERS

(71) Applicant: ON-BRIGHT ELECTRONICS (SHANGHAI) CO., LTD., Shanghai (CN)

(72) Inventors: Yunchao Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,047

(22) Filed: Apr. 10, 2015

(65) Prior Publication Data

US 2015/0295499 A1 Oct. 15, 2015

Related U.S. Application Data

(63) Continuation of application No. 12/859,138, filed on Aug. 18, 2010, now Pat. No. 9,088,217.

(Continued)

(51) Int. Cl.
*H02M 3/335* (2006.01)
*H02M 1/00* (2006.01)

(52) U.S. Cl.
CPC . *H02M 3/33507* (2013.01); *H02M 2001/0019* (2013.01); *H02M 2001/0032* (2013.01); *Y02B 70/16* (2013.01)

(58) Field of Classification Search
CPC ............. H02M 3/33507; H02M 2001/0019; H02M 2001/0032; H02M 2001/0006; H02M 2001/0022; H02M 3/33523; Y02B 70/16; H03K 17/605
See application file for complete search history.

(56) References Cited

U.S. PATENT DOCUMENTS 3,912,340 A 10/1975 Bertolasi
5,247,241 A 9/1993 Ueda
(Continued)

FOREIGN PATENT DOCUMENTS

CN 1841893 A 10/2006
CN 1917322 A 2/2007
(Continued)

OTHER PUBLICATIONS

Taiwan Patent Office, Office Action mailed Oct. 16, 2015, in Application No. 102116550.
(Continued)

*Primary Examiner* — Adolf Berhane
*Assistant Examiner* — Henry Lee, III
(74) *Attorney, Agent, or Firm* — Jones Day

(57) ABSTRACT

System and method for regulating an output voltage of a power conversion system. The system includes a sampling component located on a chip, which for example, receives an input voltage through a terminal. The sampling component, for example, samples the input voltage and generates a sampled voltage. Additionally, the system includes an error amplifier which for example, processes information associated with the sampled voltage and a threshold voltage and generates a first output signal, and a first signal generator which for example, generates a second output signal and one or more third output signals. Moreover, the system includes a comparator which for example, receives the first output signal and the second output signal and generates a comparison signal, and a gate driver directly or indirectly coupled to the comparator. The gate driver, for example, (Continued)

generates a drive signal based on at least information associated with the comparison signal.

36 Claims, 15 Drawing Sheets

Related U.S. Application Data

(60) Provisional application No. 61/235,561, filed on Aug. 20, 2009.

(56) References Cited

U.S. PATENT DOCUMENTS

| | | | |
|---|---|---|---|
| 5,497,119 A | 3/1996 | Tedrow et al. | |
| 5,568,044 A | 10/1996 | Bittner | |
| 5,729,448 A | 3/1998 | Haynie et al. | |
| 6,134,060 A | 10/2000 | Ryat | |
| 6,292,376 B1 | 9/2001 | Kato | |
| 6,366,070 B1 | 4/2002 | Cooke et al. | |
| 6,381,151 B1 | 4/2002 | Jang | |
| 6,545,513 B2 | 4/2003 | Tsuchida et al. | |
| 6,556,478 B2 | 4/2003 | Willis et al. | |
| 6,713,995 B2 | 3/2004 | Chen | |
| 6,798,086 B2 | 9/2004 | Utsunomiya | |
| 6,947,298 B2 | 9/2005 | Uchida | |
| 6,954,056 B2 | 10/2005 | Hoshino et al. | |
| 6,972,528 B2 | 12/2005 | Shao | |
| 6,972,548 B2 | 12/2005 | Tzeng et al. | |
| 6,977,824 B1 | 12/2005 | Yang et al. | |
| 7,035,119 B2 | 4/2006 | Koike | |
| 7,054,169 B2 | 5/2006 | Huh et al. | |
| 7,116,089 B1 | 10/2006 | Nguyen et al. | |
| 7,173,404 B2 | 2/2007 | Wu | |
| 7,208,927 B1 | 4/2007 | Nguyen | |
| 7,262,587 B2 | 8/2007 | Takimoto et al. | |
| 7,265,999 B2 | 9/2007 | Murata et al. | |
| 7,345,895 B2 | 3/2008 | Zhu et al. | |
| 7,394,634 B2 | 7/2008 | Fang et al. | |
| 7,414,865 B2 | 8/2008 | Yang | |
| 7,456,623 B2 | 11/2008 | Hasegawa et al. | |
| 7,492,619 B2 | 2/2009 | Ye et al. | |
| 7,522,431 B2 | 4/2009 | Huynh et al. | |
| 7,605,576 B2 | 10/2009 | Kanakubo | |
| 7,609,039 B2 | 10/2009 | Hasegawa | |
| 7,684,220 B2 | 3/2010 | Fang et al. | |
| 7,684,462 B2 | 3/2010 | Ye et al. | |
| 7,826,237 B2 | 11/2010 | Zhang et al. | |
| 7,852,055 B2 | 12/2010 | Michishita | |
| 7,898,825 B2 | 3/2011 | Mulligan et al. | |
| 7,990,202 B2 | 8/2011 | Fang et al. | |
| 8,085,027 B2 | 12/2011 | Lin et al. | |
| 8,213,203 B2 | 7/2012 | Fei et al. | |
| 8,305,776 B2 | 11/2012 | Fang | |
| 8,331,112 B2 | 12/2012 | Huang et al. | |
| 8,339,814 B2 | 12/2012 | Zhang et al. | |
| 8,391,028 B2 | 3/2013 | Yeh | |
| 8,488,342 B2 | 7/2013 | Zhang et al. | |
| 8,526,203 B2 | 9/2013 | Huang et al. | |
| 8,879,289 B2 | 11/2014 | Lin et al. | |
| 8,891,256 B2 | 11/2014 | Fang et al. | |
| 8,971,062 B2 | 3/2015 | Huang et al. | |
| 8,982,585 B2 | 3/2015 | Fang | |
| 2002/0080625 A1 | 6/2002 | Goyhenetche et al. | |
| 2002/0080631 A1 | 6/2002 | Kanouda et al. | |
| 2003/0174520 A1 | 9/2003 | Bimbaud | |
| 2004/0075600 A1 | 4/2004 | Vera et al. | |
| 2005/0057238 A1 | 3/2005 | Yoshida | |
| 2005/0116697 A1 | 6/2005 | Matsuo et al. | |
| 2005/0222646 A1 | 10/2005 | Kroll et al. | |
| 2005/0270807 A1 | 12/2005 | Strijker | |
| 2006/0034102 A1* | 2/2006 | Yang | H02M 3/33507 363/21.13 |
| 2006/0043953 A1 | 3/2006 | Xu | |
| 2006/0050539 A1* | 3/2006 | Yang | H02M 3/33523 363/21.16 |
| 2006/0055433 A1* | 3/2006 | Yang | H02M 3/33507 327/10 |
| 2006/0273772 A1 | 12/2006 | Groom | |
| 2007/0115696 A1 | 5/2007 | Berghegger | |
| 2007/0171687 A1 | 7/2007 | Kogel et al. | |
| 2007/0241733 A1* | 10/2007 | Chen | H02M 3/156 323/288 |
| 2007/0273345 A1 | 11/2007 | Chen et al. | |
| 2008/0061754 A1 | 3/2008 | Hibi | |
| 2008/0112193 A1 | 5/2008 | Yan et al. | |
| 2008/0157742 A1 | 7/2008 | Martin et al. | |
| 2008/0159378 A1 | 7/2008 | Kris | |
| 2008/0225563 A1 | 9/2008 | Seo | |
| 2008/0252345 A1 | 10/2008 | Deschamp et al. | |
| 2009/0051336 A1 | 2/2009 | Hartlieb et al. | |
| 2009/0058387 A1* | 3/2009 | Huynh | H02M 3/33523 323/282 |
| 2009/0073727 A1 | 3/2009 | Huynh et al. | |
| 2009/0121697 A1 | 5/2009 | Aiura et al. | |
| 2009/0141520 A1* | 6/2009 | Grande | H02M 3/33523 363/21.16 |
| 2009/0175057 A1* | 7/2009 | Grande | H02M 3/33507 363/21.15 |
| 2009/0206814 A1 | 8/2009 | Zhang et al. | |
| 2009/0302817 A1 | 12/2009 | Nagai | |
| 2010/0061126 A1 | 3/2010 | Huynh et al. | |
| 2010/0128501 A1 | 5/2010 | Huang et al. | |
| 2010/0141178 A1 | 6/2010 | Negrete et al. | |
| 2010/0219802 A1 | 9/2010 | Lin et al. | |
| 2010/0225293 A1 | 9/2010 | Wang et al. | |
| 2011/0044076 A1 | 2/2011 | Zhang et al. | |
| 2011/0149614 A1 | 6/2011 | Stracquadaini | |
| 2011/0182089 A1 | 7/2011 | genannt Berghegger | |
| 2011/0248770 A1 | 10/2011 | Fang et al. | |
| 2011/0267853 A1 | 11/2011 | Yang et al. | |
| 2012/0013321 A1 | 1/2012 | Huang et al. | |
| 2012/0075891 A1 | 3/2012 | Zhang et al. | |
| 2012/0139435 A1 | 6/2012 | Storm | |
| 2012/0147630 A1 | 6/2012 | Cao et al. | |
| 2012/0153919 A1 | 6/2012 | Garbossa et al. | |
| 2012/0195076 A1 | 8/2012 | Zhang et al. | |
| 2012/0224397 A1 | 9/2012 | Yeh | |
| 2012/0257423 A1 | 10/2012 | Fang | |
| 2012/0281438 A1 | 11/2012 | Fang et al. | |
| 2012/0300508 A1 | 11/2012 | Fang | |
| 2013/0027989 A1 | 1/2013 | Fang | |
| 2013/0033905 A1 | 2/2013 | Lin et al. | |
| 2013/0051090 A1 | 2/2013 | Xie et al. | |
| 2013/0182476 A1 | 7/2013 | Yang et al. | |
| 2013/0223107 A1 | 8/2013 | Zhang et al. | |
| 2013/0272033 A1 | 10/2013 | Zhang et al. | |
| 2013/0308350 A1 | 11/2013 | Huang et al. | |
| 2014/0078790 A1 | 3/2014 | Lin et al. | |
| 2014/0160809 A1 | 6/2014 | Lin et al. | |
| 2014/0268920 A1 | 9/2014 | Fang et al. | |
| 2015/0055378 A1 | 2/2015 | Lin et al. | |
| 2015/0162820 A1 | 6/2015 | Zhang et al. | |
| 2015/0311804 A1 | 10/2015 | Fang | |
| 2016/0028318 A1 | 1/2016 | Fang et al. | |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |

(56) References Cited

FOREIGN PATENT DOCUMENTS

| | | |
|---|---|---|
| CN | 101826796 A | 9/2010 |
| CN | 101515756 B | 11/2011 |
| CN | 102332826 A | 1/2012 |
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102983760 A | 3/2013 |
| CN | 103166198 A | 6/2013 |
| CN | 103296904 A | 9/2013 |
| TW | 200840174 A | 10/2008 |
| TW | 200937157 A | 9/2009 |
| TW | I 437808 | 5/2014 |
| TW | I 448060 | 8/2014 |

OTHER PUBLICATIONS

United States Patent and Trademark Office, Notice of Allowance mailed Oct. 2, 2015, in U.S. Appl. No. 13/052,869.
United States Patent and Trademark Office, Notice of Allowance mailed Oct. 2, 2015, in U.S. Appl. No. 13/722,788.
United States Patent and Trademark Office, Notice of Allowance mailed Oct. 5, 2015, in U.S. Appl. No. 13/915,477.
United States Patent and Trademark Office, Notice of Allowance mailed Sep. 30, 2015, in U.S. Appl. No. 13/857,836.
United States Patent and Trademark Office, Office Action mailed Aug. 20, 2015, in U.S. Appl. No. 13/646,268.
United States Patent and Trademark Office, Office Action mailed Mar. 7, 2016, in U.S. Appl. No. 14/293,280.
Chinese Patent Office, Office Action mailed Jun. 4, 2014, in Application No. 201110144768.2.
Chinese Patent Office, Office Action mailed Nov. 5, 2013, in Application No. 201210529679.4.
Chinese Patent Office, Office Action mailed Nov. 5, 2013, in Application No. 201310078547.9.
Chinese Patent Office, Office Action mailed Nov. 14, 2013, in Application No. 201110224933.5.
Chinese Patent Office, Office Action mailed Dec. 8, 2014, in Application No. 201110034669.9.
Chinese Patent Office, Office Action mailed Nov. 12, 2013, in Application No. 201110051423.2.
Chinese Patent Office, Office Action mailed Nov. 7, 2013, in Application No. 201210342097.5.
Taiwan Patent Office, Office Action mailed May 6, 2015, in Application No. 102116550.
Taiwan Patent Office, Office Action mailed Oct. 6, 2014, in Application No. 102115002.
Taiwan Patent Office, Office Action mailed Oct. 1, 2014, in Application No. 102116551.
Taiwan Patent Office, Office Action mailed Mar. 3, 2014, in Application No. 100127088.
United States Patent and Trademark Office, Notice of Allowance mailed Jul. 30, 2014, in U.S. Appl. No. 12/859,138.
United States Patent and Trademark Office, Notice of Allowance mailed Jan. 20, 2015, in U.S. Appl. No. 12/859,138.
United States Patent and Trademark Office, Office Action mailed Dec. 5, 2012, in U.S. Appl. No. 12/859,138.
United States Patent and Trademark Office, Office Action mailed Jul. 31, 2013, in U.S. Appl. No. 12/859,138.
United States Patent and Trademark Office, Notice of Allowance mailed Jun. 22, 2015, U.S. Appl. No. 13/052,869.
United States Patent and Trademark Office, Notice of Allowance mailed Aug. 7, 2015, in U.S. Appl. No. 14/151,209.
United States Patent and Trademark Office, Office Action mailed Apr. 1, 2014, in U.S. Appl. No. 13/052,869.
United States Patent and Trademark Office, Office Action mailed Nov. 5, 2014, in U.S. Appl. No. 13/052,869.
United States Patent and Trademark Office, Office Action mailed Feb. 15, 2013, in U.S. Appl. No. 13/052,869.
United States Patent and Trademark Office, Office Action mailed Oct. 1, 2013, in U.S. Appl. No. 13/052,869.
United States Patent and Trademark Office, Office Action mailed Feb. 24, 2015, in U.S. Appl. No. 13/722,788.
United States Patent and Trademark Office, Office Action mailed Mar. 12, 2015, in U.S. Appl. No. 13/857,836.
United States Patent and Trademark Office, Office Action mailed Mar. 12, 2015, in U.S. Appl. No. 13/915,477.
Chinese Patent Office, Office Action mailed Dec. 4, 2015, in Application No. 201410226277.6.
Chinese Patent Office, Office Action mailed Nov. 25, 2015, in Application No. 201310656906.4.
United States Patent and Trademark Office, Notice of Allowance mailed Nov. 16, 2015, in U.S. Appl. No. 14/151,209.
United States Patent and Trademark Office, Notice of Allowance mailed Jan. 8, 2016, in U.S. Appl. No. 13/052,869.
United States Patent and Trademark Office, Notice of Allowance mailed Feb. 1, 2016, in U.S. Appl. No. 13/722,788.
United States Patent and Trademark Office, Notice of Allowance mailed Feb. 10, 2016, in U.S. Appl. No. 13/857,836.
United States Patent and Trademark Office, Notice of Allowance mailed Feb. 22, 2016, in U.S. Appl. No. 13/915,477.
United States Patent and Trademark Office, Corrected Notice of Allowability mailed May 26, 2016, in U.S. Appl. No. 13/052,869.
United States Patent and Trademark Office, Office Action mailed May 17, 2016, in U.S. Appl. No. 13/646,268.
United States Patent and Trademark Office, Office Action mailed Apr. 20, 2016, in U.S. Appl. No. 14/488,176.
United States Patent and Trademark Office, Office Action mailed Nov. 22, 2016, in U.S. Appl. No. 13/646,268.
United States Patent and Trademark Office, Notice of Allowance mailed Sep. 22, 2016, in U.S. Appl. No. 14/293,280.
United States Patent and Trademark Office, Notice of Allowance mailed Oct. 13, 2016, in U.S. Appl. No. 14/488,176.
United States Patent and Trademark Office, Office Action mailed Nov. 2, 2016, in U.S. Appl. No. 14/824,018.
United States Patent and Trademark Office, Office Action mailed Dec. 29, 2016, in U.S. Appl. No. 15/040,674.

* cited by examiner

SYSTEMS AND METHODS FOR LOAD COMPENSATION WITH PRIMARY-SIDE SENSING AND REGULATION FOR FLYBACK POWER CONVERTERS

1. CROSS-REFERENCES TO RELATED APPLICATIONS

This application is a continuation of U.S. patent application Ser. No. 12/859,138, filed Aug. 18, 2010, which claims priority to U.S. Provisional Application No. 61/235,561, filed Aug. 20, 2009, both applications being commonly assigned and incorporated by reference herein for all purposes.

2. BACKGROUND OF THE INVENTION

The present invention is directed to integrated circuits. More particularly, the invention provides systems and methods for load compensation with primary-side sensing and regulation. Merely by way of example, the invention has been applied to a flyback power converter. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a MOS transistor.

To regulate the output voltage within a predetermined range, information related to the output voltage and the output loading often needs to be extracted. In the discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1 + R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1 + R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 112 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

The primary-side sensing and regulation can be used for both pulse-width modulation (PWM) and the pulse-frequency modulation (PFM). FIGS. 3 and 4 are each a simplified diagram showing a conventional flyback power conversion system with primary-side sensing and regulation for constant output voltage under pulse-frequency modulation. As shown, the power conversion system 300 includes an exponential generator 310, a switch 320, a primary winding 340, a secondary winding 342, a capacitor 352, an error amplifier 360, a comparator 370, a demagnetization detector 380, an oscillator 390, and terminals 330, 332, and 334. Similarly, the power conversion system 400 includes an exponential generator 410, a switch 420, a primary winding 440, a secondary winding 442, a capacitor 452, an error amplifier 460, a comparator 470, a demagnetization detector 480, an oscillator 490, and terminals 430, 432, and 434.

For example, the exponential generator 310 or 410 includes a switch-capacitor circuit controlled by an oscillation period T of an oscillator with a predetermined constant oscillation frequency. In another example, the switch 320 is a bipolar transistor, and the switch 420 is a MOS transistor.

As shown in FIG. 3 or 4, the demagnetization detector 380 or 480 outputs a signal 382 or 482 to the exponential generator 310 or 410 respectively. Additionally, the oscillator 390 or 490 also outputs a signal 392 or 492 to the exponential generator 310 or 410 respectively. Additionally, the switch 320 or 420 is controlled by a signal 396 or 496 through the terminal 334 or 434. Moreover, a signal 396 or 496 for sensing a current that flows through the primary winding 340 or 440 is received by the terminal 330 or 430.

FIG. 5 is a simplified diagram showing the conventional exponential generator 310 or 410 for the conventional power conversion system 300 or 400. The conventional exponential generator 500 can be used as the exponential generator 310 or the exponential generator 410. As shown, the exponential generator 500 includes switches 510, 520, and 540, capacitors 514 and 524, an oscillator 530, a counter 550, a frequency divider 560, a switch controller 570, and a NOT gate 580.

The switch 510 is controlled by a signal 512, the switch 520 is controlled by a signal 522, and the switch 540 is controlled by a signal 542. For example, the signal 542 is the signal 382 or 482. The signals 512 and 522 are generated based on at least a clock signal 532 outputted from the oscillator 530. For example, the clock signal 532 is the signal 392 or 492.

Specifically, when the switch 510 is closed and the switches 520 and 540 are open, a reference voltage $V_{refb}$ charges the capacitor 514. In contrast, when the switch 520 is closed and the switches 510 and 540 are open, some charges are transferred from the capacitor 514 to the capacitor 524, causing the voltage on the capacitor 524 to rise. As the voltage on the capacitor 524 becomes higher and higher, the amount of additional charges transferred from the capacitor 514 to the capacitor 524 becomes less and less when, every time, the switch 510 is made open and the switch 520 is made closed, with the switch 540 remaining open.

Hence, if the switch 540 remains open, the voltage on the capacitor 524 rises approximately exponentially with the switch 510 alternating between being open and closed and the switch 520 alternating between being closed and open. When the switch 540 is closed by the signal 542, the capacitor 524 is discharged by a reference voltage $V_{refa}$. Afterwards, the signal 542 changes the switch 540 from being closed to being open.

As shown in FIG. 5, the counter 550 also receives the signal 542 as well as a signal 552 from the frequency divider 560. The signal 552 represents rising edges of the clock signal 532 that is received by the frequency divider 560. The clock period of the clock signal 532 is denoted as T. When the signal 542 changes the switch 540 from being closed to being open, the counter 550 is also reset. Based on the signal 552, the counter 550 generates output signals 554. The output signals 554 include output signals clk2, clk4, ..., clkm, ..., and clkN, wherein 2≤m≤N. m and N are each equal to a power of 2 (e.g., 2 to the power of an integer). When the clkm signal rises from a logic low level to a logic high level (e.g., from the "0" level to the "1" level) for the first time since the reset, the time period since the last reset is $$n \times T = \frac{m \times T}{2}.$$

n represents the time period since the last reset in terms of the number of the clock periods.

Additionally, the counter 550 also sends an output signal 556 to a switch controller 570. Based on the output signal 556, the switch controller 570 closes only one of the switches that correspond to "clk", "½ clk", "¼ clk", and "⅛ clk" respectively. Specifically, if 0≤n≤64, the switch corresponding to "clk" is closed, and the switching period for the switches 510 and 520 is equal to T. If 64<n≤128, the switch corresponding to "½ clk" is closed, and the switching period for the switches 510 and 520 is equal to 2T. If 128<n≤512, the switch corresponding to "¼ clk" is closed, and the switching period for the switches 510 and 520 is equal to 4T.

If n>512, the switch corresponding to "⅛ clk" is closed, and the switching period for the switches 510 and 520 is equal to 8T. Hence, $$V_{ramp}(n) = (V_{refb} - V_{refa}) \times \left(1 - e^{-\left(\frac{n \times T}{\tau}\right)}\right) + V_{refa} \quad \text{(Equation 5)}$$

where $V_{ramp}$ represents the voltage magnitude of a signal 526. For example, the signal 526 is the signal 312 or 412. Additionally, $V_{refa}$ and $V_{refb}$ each represent a constant voltage level. For example, $V_{refa}$ equals 1V, and $V_{refb}$ equals 3V. Moreover, n represents the time for the signal 526 to rise since the last reset of the counter 550 in terms of the number of the clock periods. T is the clock period of the clock signal 532. Furthermore, τ is the time constant. Specifically, if 0≤n≤64, τ=128×T; if 64<n≤128, τ=256×T; if 128<n≤256, τ=512×T; and if 256<n, τ=1024×T.

Returning to FIG. 3 or 4, when the switch 320 or 420 is turned on, the transformer stores energy. The current flowing through the primary winding 340 or 440 ramps up linearly, and the current-sensing voltage at the terminal 330 or 430 also ramps up linearly. When the current-sensing voltage reaches a threshold for over-current protection (OCP), such as 0.5 V, the switch 320 or 420 is turned off.

When the switch 320 or 420 is turned off, the energy stored in the transformer is released to the output terminal. The demagnetization process starts, and the current flowing through the secondary winding 342 or 442 ramps down linearly. When the demagnetization process almost ends and the current flowing through the secondary winding 342 or 442 approaches zero, a sampling signal 350 or 450 is generated to sample the feedback voltage at the terminal 332 or 432. The sampled voltage is held on the capacitor 352 or 452. Additionally, the sampled/held voltage is compared with a reference voltage $V_{ref}$ such as 2V, and the difference between the sampled/held voltage and the reference voltage $V_{ref}$ is amplified by the error amplifier 360 or 460 to generate an amplified signal 362 or 462. The amplified signal 362 or 462 is received by the negative input terminal of the comparator 370 or 470, whose output signal 372 or 472 is used to generate the signal 396 or 496 respectively.

Additionally, when the demagnetization process starts, a ramp signal 312 or 412 of the exponential generator 310 or 410 is restored to an initial value. For example, the ramp signal 312 or 412 is the signal 526, which is restored to $V_{refa}$ according to Equation 5 when the demagnetization process starts. After the demagnetization process is completed, the ramp signal 312 or 412 increases exponentially. If the ramp signal 312 or 412 becomes higher than the amplified signal 362 or 462 in magnitude, a comparison signal 372 or 472 is at a logic high level (e.g., at the "1" level), and the switch 320 or 420 is turned on.

Referring to FIG. 3 or 4, the larger the output load of the power conversion system 300 or 400 is, the lower the amplified signal 362 or 462 of the error amplifier 360 or 460 becomes in magnitude. Hence, the time period when the switch 320 or 420 remains turned off also becomes shorter. In contrast, the smaller the output load of the power conversion system 300 or 400 is, the higher the amplified signal 362 or 462 of the error amplifier 360 or 460 becomes in magnitude. Hence, the time period when the switch 320 or 420 remains turned off also becomes longer.

FIG. 6 is a simplified diagram showing certain conventional waveforms for the power conversion system 300 or 400. A waveform 610 represents the signal 382 or 482 as a function of time, a waveform 620 represents the signal 396 or 496 as a function of time, a waveform 630 represents the signal 396 or 496 as a function of time, a waveform 640 represents the signal 312 or 412 as a function of time, a waveform 650 represents the signal 362 or 462 as a function of time. As shown in FIG. 6, the time period $t_{off}$ when the switch 320 or 420 remains turned off is equal to $t_{Demag}+t_{ramp}$. $t_{Demag}$ represents the time period of the demagnetization process, and $t_{ramp}$ represents the time period for the signal 312 or 412 to rise to the level of the signal 362 or 462 in magnitude. For example, the signal 312 or 412 is the signal 526 generated by the exponential generator 500. The voltage magnitude $V_{ramp}$ of the signal 526 rises until the switch 540 is closed by the signal 542. In another example, $t_{ramp}$ is equal to $n_{ramp} \times T$. In yet another example, at $n=n_{ramp}$, $V_{ramp}$ is smaller than $V_{refb}$ according to Equation 5, where n represents the time for the signal 526 to rise in terms of the number of the clock periods. In yet another example, n×T is represented by the output signals 554.

But the power conversion system 300 or 400 often cannot effectively offset the change in the output voltage as a function of the output current due to the resistance of the output cable. Hence it is highly desirable to improve the techniques of load compensation with primary-side sensing and regulation.

3. BRIEF SUMMARY OF THE INVENTION

The present invention is directed to integrated circuits. More particularly, the invention provides systems and methods for load compensation with primary-side sensing and regulation. Merely by way of example, the invention has been applied to a flyback power converter. But it would be recognized that the invention has a much broader range of applicability.

According to one embodiment, a system for regulating an output voltage of a power conversion system includes a sampling component located on a chip configured to receive an input voltage through a terminal. The sampling component is configured to sample the input voltage and generate a sampled voltage. Additionally, the system includes an error amplifier configured to process information associated with the sampled voltage and a threshold voltage and generate a first output signal, and a first signal generator configured to generate a second output signal and one or more third output signals. Moreover, the system includes a comparator configured to receive the first output signal and the second output signal and generate a comparison signal, a gate driver directly or indirectly coupled to the comparator and configured to generate a drive signal based on at least information associated with the comparison signal, and a current generator configured to receive at least the one or more third output signals and generate a compensation current flowing out of the chip through the terminal. The gate driver is further coupled to a first switch configured to receive the drive signal and affect a first current flowing through a primary winding coupled to a secondary winding. The secondary winding is associated with at least an output voltage of a power conversion system. The power conversion system includes at least the primary winding, the secondary winding, and an auxiliary winding, and the auxiliary winding is coupled to the secondary winding. The input voltage is associated with at least the auxiliary winding and depends on at least the output voltage and the compensation current. The second output signal starts to increase from a first magnitude at a first time. The one or more third output signals represent a first time period since the first time during which the second output signal increases in magnitude. The compensation current decreases in magnitude if a second time period increases, and the second time period starts from the first time and ends at a second time when the second output signal becomes equal to the first output signal in magnitude.

According to another embodiment, a system for regulating an output voltage of a power conversion system includes a sampling component located on a chip configured to receive an input voltage through a terminal. The sampling component is configured to sample the input voltage and generate a sampled voltage. Additionally, the system includes an error amplifier configured to process information associated with the sampled voltage and a threshold voltage and generate a first output signal, and a signal generator configured to receive at least an input clock signal with an input clock period and generate a second output signal and one or more output clock signals corresponding to one or more output clock periods respectively. Each of the one or more output clock periods is equal to the input clock period multiplied by an integer larger than 1. Moreover, the system includes a comparator configured to receive the first output signal and the second output signal and generate a comparison signal, and a gate driver directly or indirectly coupled to the comparator and configured to generate a drive signal based on at least information associated with the comparison signal. Also, the system includes a current generator configured to receive at least the one or more output clock signals and generate a compensation current flowing out of the chip through the terminal based on at least information associated with the one or more output clock signals. The gate driver is further coupled to a first switch configured to receive the drive signal and affect a first current flowing through a primary winding coupled to a secondary winding. The secondary winding is associated with at least an output voltage of a power conversion system. The power conversion system includes at least the primary winding, the secondary winding, and an auxiliary winding, and the auxiliary winding is coupled to the secondary winding. The input voltage is associated with at least the auxiliary winding and depends on at least the output voltage and the compensation current.

According to yet another embodiment, a method for regulating an output voltage of a power conversion system includes receiving an input voltage through a terminal of a chip, sampling the input voltage, and generating a sampled voltage based on at least information associated with the input voltage. Additionally, the method includes processing information associated with the sampled voltage and a threshold voltage, generating a first output signal based on at least information associated with the sampled voltage and the threshold voltage, generating a second output signal and one or more third output signals, receiving the first output signal and the second output signal, and generating a comparison signal based on at least information associated with the first output signal and the second output signal. Moreover, the method includes receiving the comparison signal, process information associated with the comparison signal, and generating a drive signal based on at least information associated with the comparison signal to affect a first current flowing through a primary winding coupled to a secondary winding. The secondary winding is associated with at least an output voltage of a power conversion system and coupled to an auxiliary winding of the power conversion system. Also, the method includes receiving at least one or more third output signals, processing information associated with the one or more third output signals, and generating a compensation current flowing out of the chip through the terminal based on at least information associated with the one or more third output signals. The input voltage depends on at least the output voltage and the compensation current. The second output signal starts to increase from a first magnitude at a first time. The one or more third output signals represent a first time period since the first time during which the second output signal increases in magnitude. The compensation current decreases in magnitude if a second time period increases, and the second time period starts from the first time and ends at a second time when the second output signal becomes equal to the first output signal in magnitude.

According to yet another embodiment, a method for regulating an output voltage of a power conversion system includes receiving an input voltage through a terminal of a chip, sampling the input voltage, and generating a sampled voltage based on at least information associated with the input voltage. Additionally, the method includes processing information associated with the sampled voltage and a threshold voltage, generating a first output signal based on at least information associated with the sampled voltage and the threshold voltage, receiving at least an input clock signal with an input clock period, and generating a second output signal and one or more output clock signals based on at least information associated with the input clock signal. The one or more output clock signals correspond to one or more output clock periods respectively, and each of the one or more output clock periods is equal to the input clock period multiplied by an integer larger than 1. Moreover, the method includes receiving the first output signal and the second output signal, generating a comparison signal based on at least information associated with the first output signal and the second output signal, receiving the comparison signal, process information associated with the comparison signal, and generating a drive signal based on at least information associated with the comparison signal to affect a first current flowing through a primary winding coupled to a secondary winding. The secondary winding is associated with at least an output voltage of a power conversion system and coupled to an auxiliary winding of the power conversion system. Also, the method includes receiving at least the one or more output clock signals, processing information associated with the one or more output clock signals, and generating a compensation current flowing out of the chip through the terminal based on at least information associated with the one or more output clock signals. The input voltage depends on at least the output voltage and the compensation current.

Many benefits are achieved by way of the present invention over conventional techniques. Certain embodiments of the present invention provide a digitally-controlled nonlinear load compensation mechanism where the controller chip does not need an external pin for compensation. For example, the nonlinear load compensation mechanism resolves the issues of cross regulation between the consumption power of the controller chip and the output power of the power conversion system. In another example, the cross regulation often results in higher standby power loss and/or poor regulation at no load or light load conditions, but the nonlinear load compensation mechanism can achieve very low standby power loss and/or improve regulation of the output voltage of the power conversion system. Some embodiments of the present invention can reduce cost of the power conversion system. Certain embodiments of the present invention can provide external adjustment for the magnitude of load compensation.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for load compensation with primary-side sensing and regulation. Merely by way of example, the invention has been applied to a flyback power converter. But it would be recognized that the invention has a much broader range of applicability.

Figure 1:
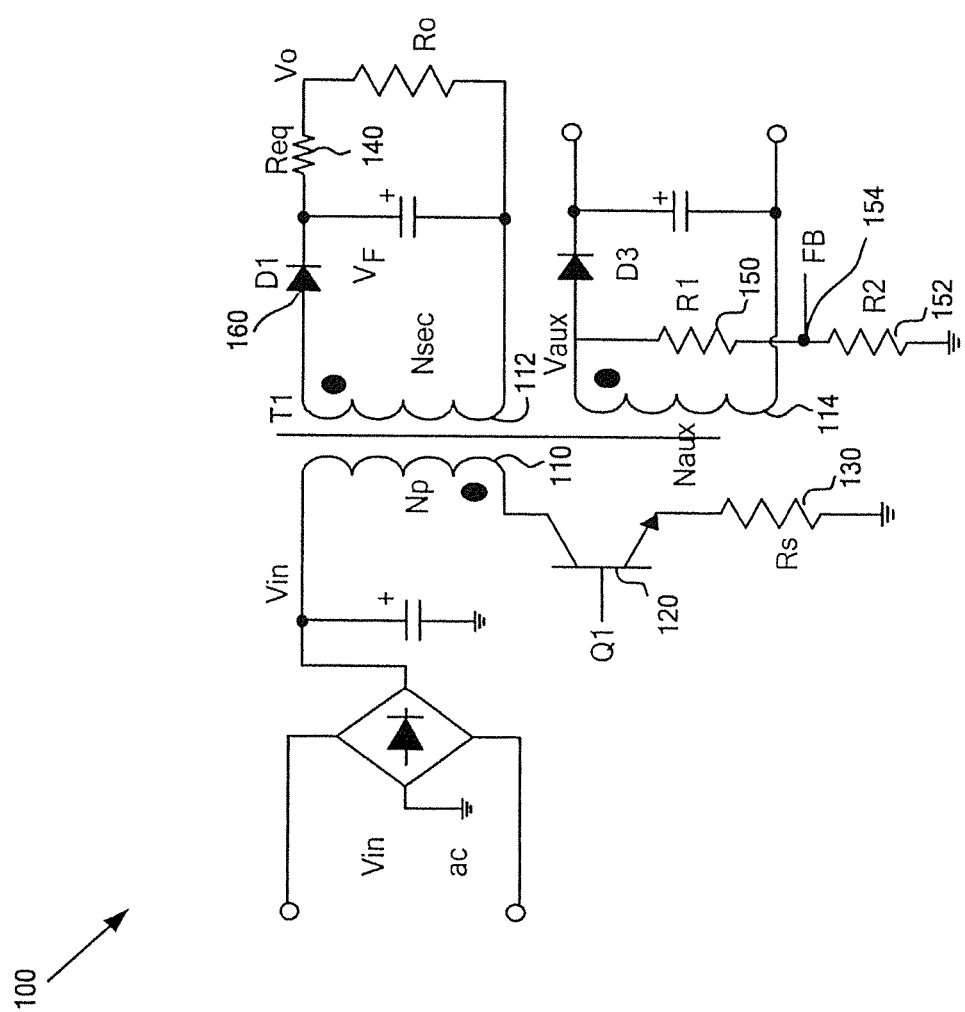
FIG. 1 is a simplified diagram showing a conventional flyback power conversion system with primary-side sensing and regulation.
Figure 2:
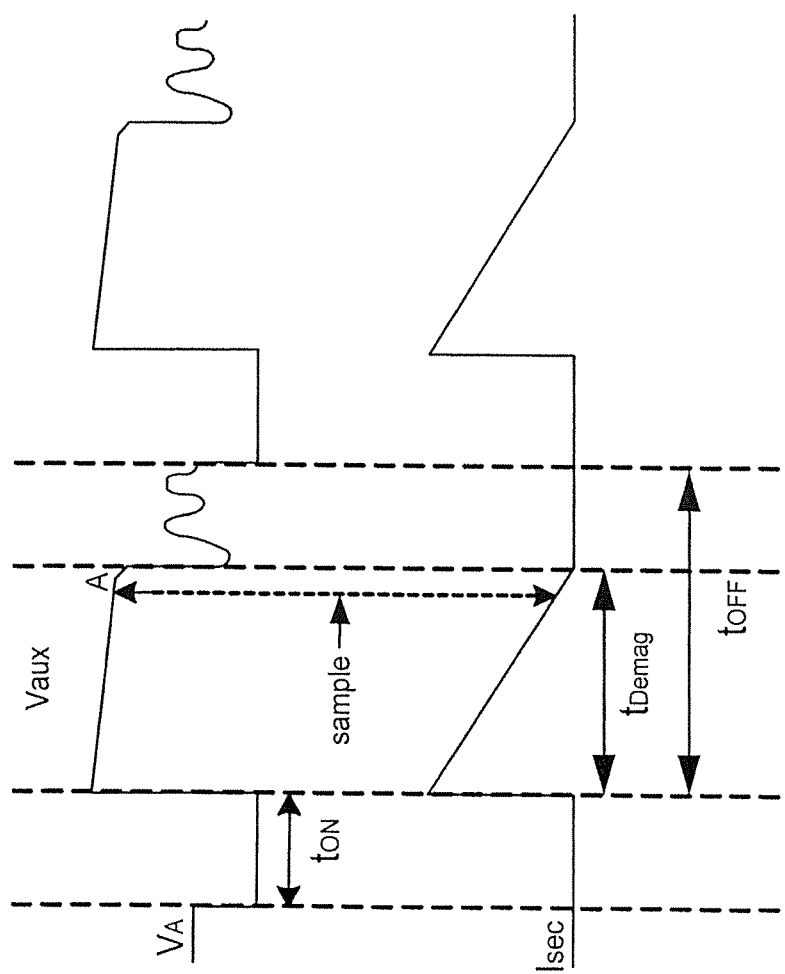
FIG. 2 is a simplified diagram showing a conventional operation mechanism for the flyback power conversion system.
Figure 3:
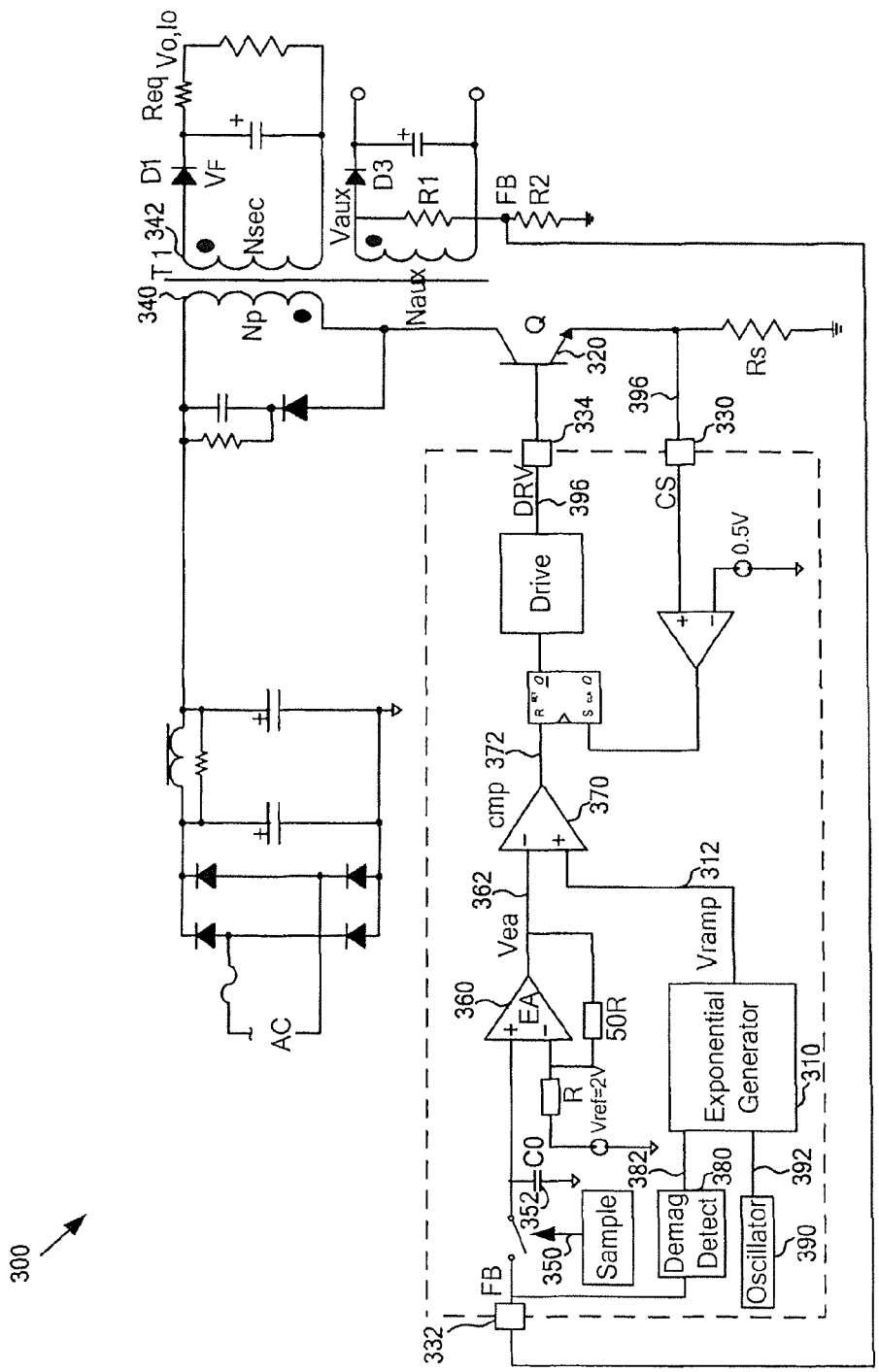
FIGS. 3 and 4 are each a simplified diagram showing a conventional flyback power conversion system with primary-side sensing and regulation for constant output voltage under pulse-frequency modulation.
Figure 4:
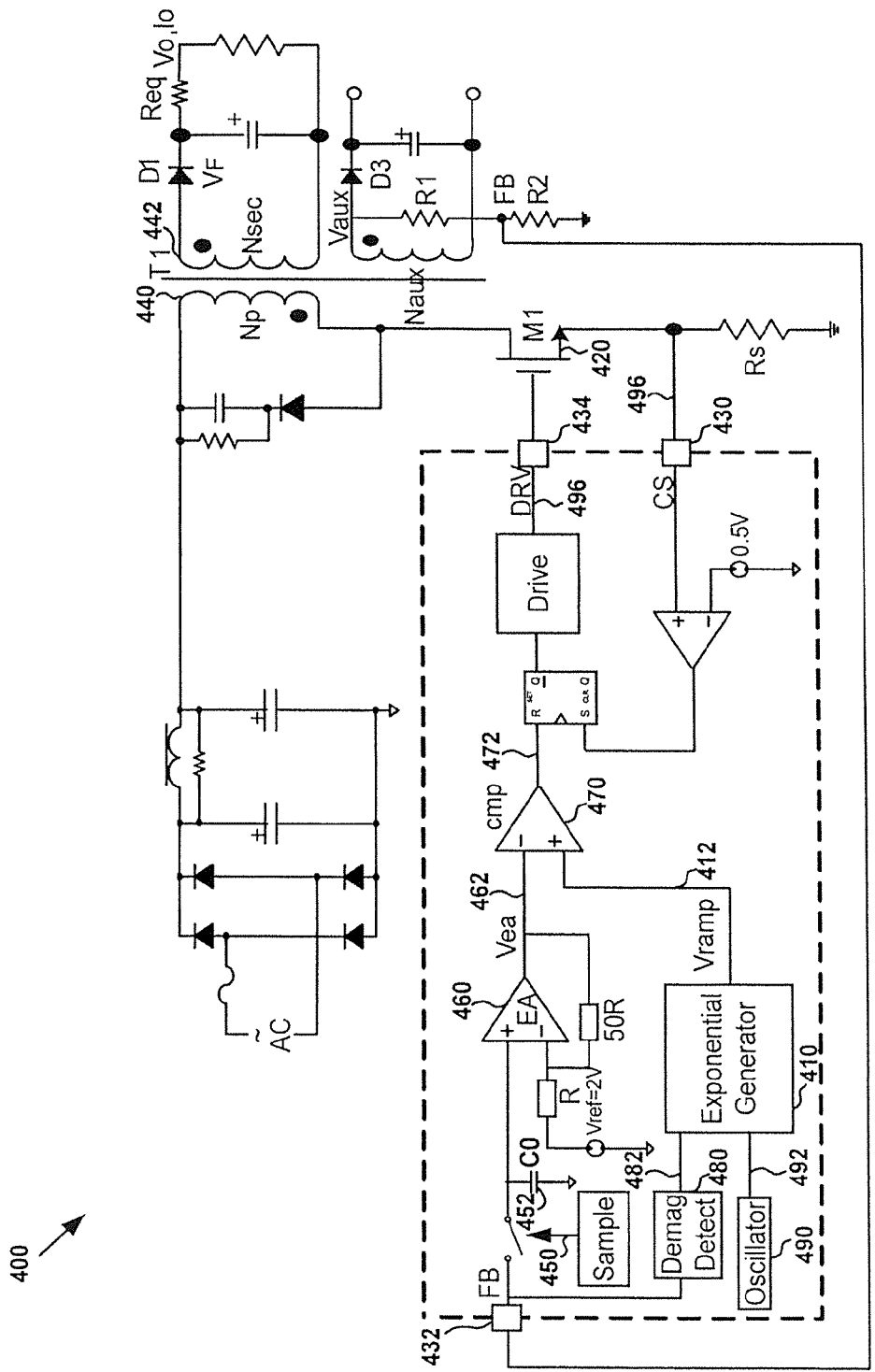
Figure 5:
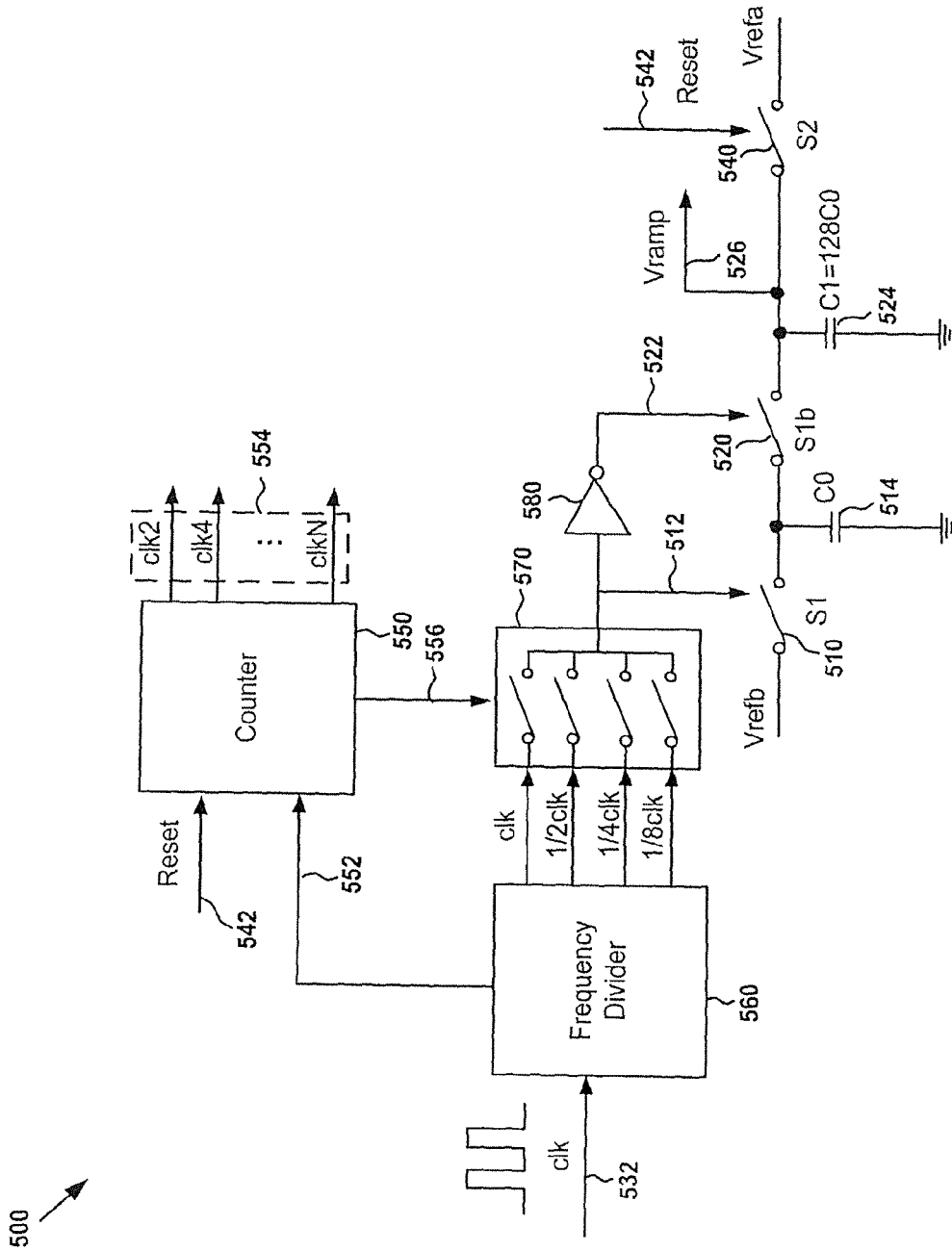
FIG. 5 is a simplified diagram showing the conventional exponential generator for the conventional power conversion system.
Figure 6:
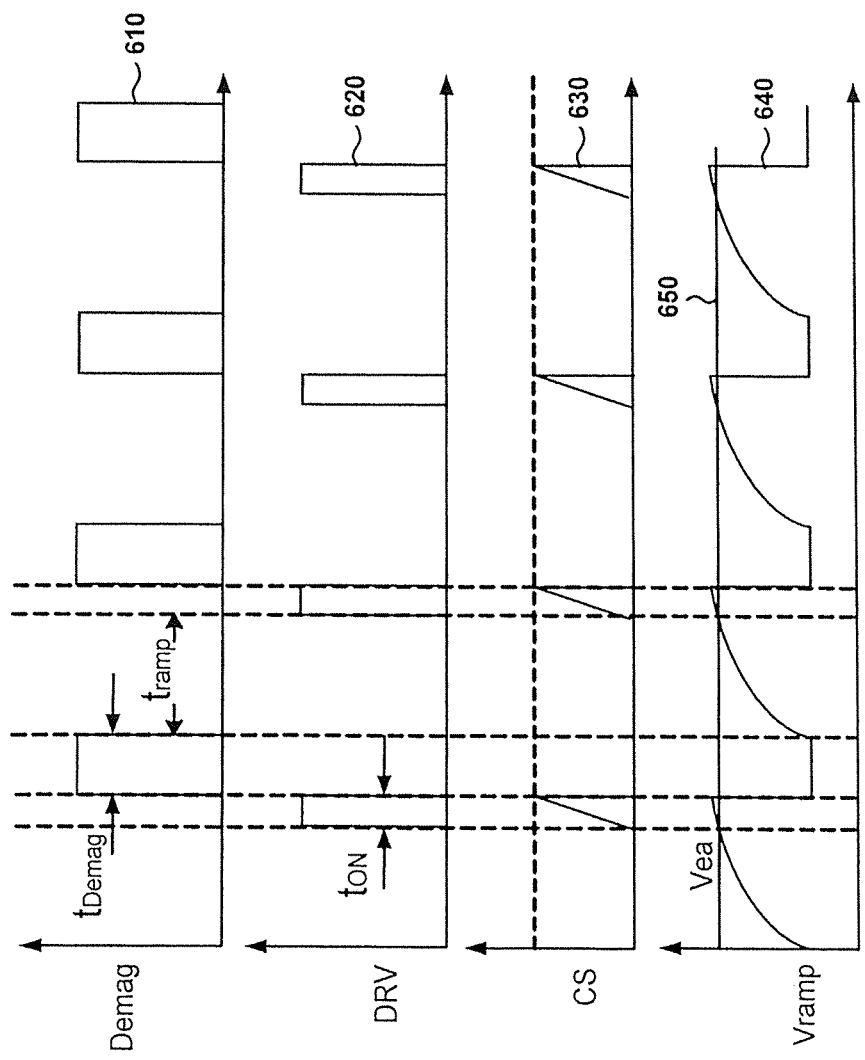
FIG. 6 is a simplified diagram showing certain conventional waveforms for the power conversion system.

Referring to FIGS. 1 and 2, a compensation system is needed to offset the change in the output voltage as a function of the output current due to the resistance of the output cable. For example, in the discontinuous conduction mode (DCM), the energy transfer relationship for the flyback power conversion system 100 is $$\frac{1}{2} \times L \times I_p^2 \times F_s \times \eta = P_o = V_o \times I_o \quad \text{(Equation 6)}$$

Therefore $$I_o = \frac{L \times I_p^2 \times F_s \times \eta}{2 \times V_o} \quad \text{(Equation 7)}$$

where L represents the conductance of the primary winding 110, and $I_p$ represents the peak current of the primary winding 110. Additionally, $F_s$ represents the switching frequency of the power switch 120, and $\eta$ represents the conversion efficiency of the system 100. Moreover, $V_o$ and $I_o$ represent the output voltage and the output current respectively, and $P_o$ represents the output power.

In another example, for a given power conversion system 100, L, $V_o$ and $\eta$ are constants. If $I_p$ is also regulated at a constant level, then $$a = \frac{L \times I_p^2 \times \eta}{2 \times V_o}$$

is also constant. Hence, $$I_o = a \times F_s \quad \text{(Equation 8)}$$

Based on Equation 8, the output current $I_o$ is proportional to the switching frequency $F_s$. Therefore, the switching frequency may be used for load compensation.

Some conventional techniques for linear load compensation often use a filter with a large time constant to convert the switching frequency into a DC voltage, and then use the DC voltage to adjust a reference voltage or convert the DC voltage into a compensation current that flows into the feedback pin that is directed connected to the node 154.

If the reference voltage is adjusted based on the DC voltage, Equation 3 becomes:

$$V_{FB} = V_{ref} + \Delta V \quad \text{(Equation 9)}$$

where $V_{ref}$ represents the reference voltage, and $\Delta V$ represents the adjustment to the reference voltage.

$$\text{If } \Delta V = k \times n \times I_o \times R_{eq} \quad \text{(Equation 10)}$$

then combining Equations (1) and (9), the following can be obtained:

$$V_o = \frac{V_{ref}}{k \times n} - V_F \quad \text{(Equation 11)}$$

Hence, if Equation 10 is satisfied, the output voltage $V_o$ is independent of the load current $I_o$.

Additionally, $\Delta V = b \times F_s \quad \text{(Equation 12)}$

Combining Equations 10 and 12, the following can be obtained:

$$k \times n \times I_o \times R_{eq} = b \times F_s \quad \text{(Equation 13)}$$

With Equation 8, Equation 13 is transformed to:

$$k \times n \times a \times F_s \times R_{eq} = b \times F_s \quad \text{(Equation 14)}$$

Hence b is a constant as follows:

$$b = k \times n \times a \times R_{eq} \quad \text{(Equation 15)}$$

If the adjustment $\Delta V$ to the reference voltage changes linearly with the switching frequency $F_s$ according to Equations 12 and 15, the change in the output voltage as a function of the output current due to the resistance of the output cable may be compensated under certain conditions.

Such compensation is valid if the cross regulation between the consumption power of the controller chip and the output power of the system 100 can be neglected, such as when the power consumption of the auxiliary winding 114 is much lower than the output power of the power conversion system 100. But the power conversion system 100 is actually a two-output system that has an auxiliary-winding output and a secondary-winding output. The auxiliary-winding output is often used to power the controller chip. When the output load power provided by the secondary winding 112 is low, such as with no load or very light load, the consumption power of the controller chip may become comparable to the output load power. Hence, the consumption power of the controller chip can no longer be neglected.

$$\text{If } P_c = c \times P_o \quad \text{(Equation 16)}$$

then Equation 6 should be modified as follows:

$$\frac{1}{2} \times L \times I_p^2 \times F_s \times \eta = (1+c) \times P_o = (1+c) \times V_o \times I_o \quad \text{(Equation 17)}$$

wherein $P_c$ represents the consumption power of the controller chip, and c represents the ratio between the consumption power of the controller chip and the output load power. For example, for a given $P_c$, c decreases with the increasing $P_o$.

If c is much smaller than 1 (e.g., if the output load power is much higher then the consumption power of the controller chip), the consumption power of the controller chip can be neglected. Consequently, Equation 17 can be approximated into Equation 6. If c is not much smaller than 1, the adjustment $\Delta V$ to the reference voltage should be $$\Delta V = \beta \times \frac{1}{1+c} \times I_o \quad \text{(Equation 18)}$$

If c is much smaller than 1, Equation 18 can be approximated as below.

$$\Delta V = \beta \times I_o \quad \text{(Equation 19)}$$

$$\text{where } \beta = \frac{b}{a} = k \times n \times R_{eq} \quad \text{(Equation 20)}$$

where n represents the turns ratio between the auxiliary winding 114 and the secondary winding 112, and $R_{eq}$ represents the resistance value of the equivalent resistor 140 for the output cable. Additionally, k represents the feedback coefficient as described, for example, in Equation 2.

Figure 7:
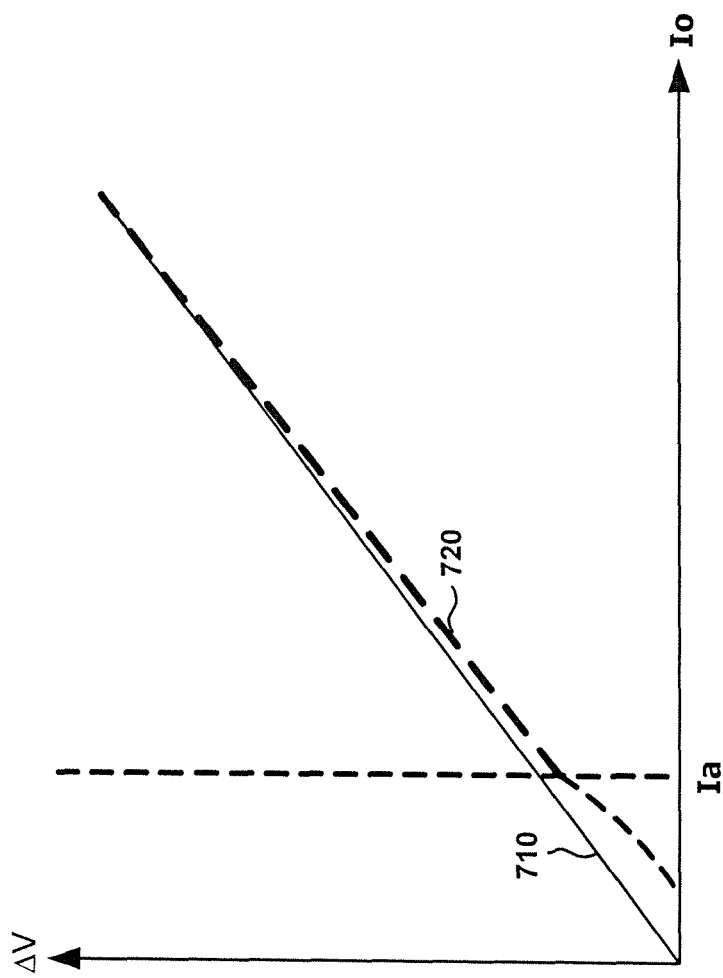
FIG. 7 is a simplified diagram showing the adjustment to the reference voltage as functions of the output current.

FIG. 7 is a simplified diagram showing the adjustment to the reference voltage as functions of the output current. A line 710 represents the adjustment to the reference voltage as a function of the output current according to Equation 10, and a line 720 represents the adjustment to the reference voltage as another function of the output current according to Equation 18. The line 710 corresponds to linear compensation for achieving constant output voltage, and the line 720 corresponds to non-linear compensation for achieving constant output voltage.

As shown in FIG. 7, if $I_o$ is larger than $I_a$ (e.g., if the output load power is much larger than the consumption power of the controller chip, or if c is much smaller than 1), the line 710 and the line 720 are close to each other. If $I_o$ is smaller than $I_a$ (e.g., if the output load power is not much larger than the consumption power of the controller chip, or if c is not much smaller than 1), the smaller is $I_o$ (e.g., the smaller is the output load power), the larger the difference between the line 710 and the line 720 becomes. Consequently, if the output load power becomes lower, the output voltage may drift higher if the linear compensation is performed as shown by the line 710. A dummy load current may be used to keep $I_o$ larger than $I_a$ in order to improve effectiveness of the linear compensation in achieving constant output voltage. But the dummy load current often cause an increase in standby power. In contrast, using the non-linear compensation as shown by the line 720 can overcome the weakness of the linear compensation according to certain embodiments.

Figure 8:
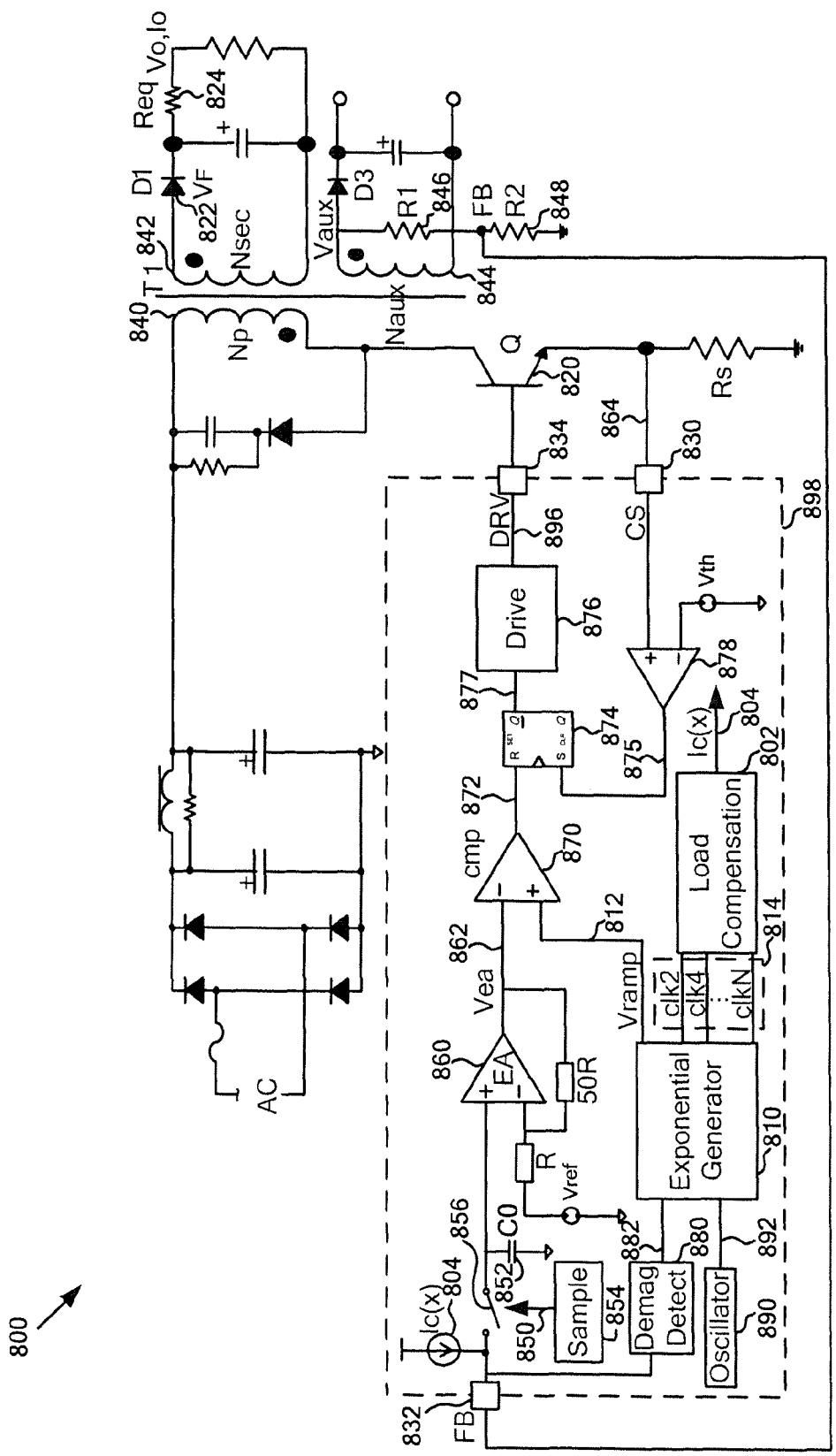
FIG. 8 is a simplified diagram showing a flyback power conversion system with non-linear compensation according to an embodiment of the present invention.

FIG. 8 is a simplified diagram showing a flyback power conversion system with non-linear compensation according to an embodiment of the present invention. This diagram is merely an example, which should not unduly limit the scope of the claims. One of ordinary skill in the art would recognize many variations, alternatives, and modifications.

The power conversion system 800 includes an exponential generator 810, a switch 820, a primary winding 840, a secondary winding 842, an auxiliary winding 844, a capacitor 852, a sampling controller 854, a sampling switch 856, an error amplifier 860, comparators 870 and 878, a flip-flop component 874, and a gate driver 876, a demagnetization detector 880, an oscillator 890, terminals 830, 832, and 834, a compensation current generator 802, resistors 846 and 848, a diode 822, and an equivalent resistor 824 for an output cable. For example, the terminals 830, 832, and 834 are terminals for a controller chip 898. In another example, the switch 820 is a bipolar transistor. In yet another example, the exponential generator 810 is the exponential generator 500. According to one embodiment, signals 882, 892, 812 are the signal 542, 532, and 526 respectively, and signals 814 are the signals 554.

As shown in FIG. 8, the demagnetization detector 880 outputs a signal 882 to the exponential generator 810, and the oscillator 890 also outputs a signal 892 to the exponential generator 810. In one embodiment, the switch 820 is controlled by a signal 896 through the terminal 834. In another embodiment, a signal 864 for sensing a current that flows through the primary winding 840 is received by the terminal 830. For example, the signal 864 is received by the comparator 878, which compares the signal 864 with a threshold voltage $V_{th}$ (e.g., 0.5V) and generates a signal 875.

In another example, when the switch 820 is turned on, the transformer stores energy. According to one embodiment, the current flowing through the primary winding 840 ramps up linearly, and the current-sensing voltage at the terminal 830 also ramps up linearly. According to another embodiment, when the current-sensing voltage reaches a threshold for over-current protection (OCP), such as 0.5 V, the switch 820 is turned off.

In yet another example, when the switch 820 is turned off, the energy stored in the transformer is released to the output terminal. According to one embodiment, the demagnetization process starts, and the current flowing through the secondary winding 842 ramps down linearly. For example, when the demagnetization process almost ends and the current flowing through the secondary winding 842 approaches zero, a sampling signal 850 is generated by the sampling controller 854 to sample the feedback voltage at the terminal 832 by closing the sampling switch 856. In another example, after the sampling process is completed, the sampling switch 856 is open in response to the sampling signal 850. In yet another example, the sampled voltage is held on the capacitor 852, and compared with a reference voltage $V_{ref}$, such as 2V. The difference between the sampled/held voltage and the reference voltage $V_{ref}$ is amplified by the error amplifier 860 to generate an amplified signal 862 according to an embodiment. According to another embodiment, the amplified signal 862 is received by the negative input terminal of the comparator 870, whose output signal 872 is used to generate the signal 896. For example, the output signal 872 is received by the flip-flop component 874, which also receives the signal 875 from the comparator 878. In another example, the flip-flop component 874 generates a signal 877 based on at least information associated with the signals 872 and 875. In yet another example, the gate driver 876 receives the signal 877 and generates the signal 896.

In yet another example, when the demagnetization process starts, a ramp signal 812 of the exponential generator 810 is restored to an initial value. According to one embodiment, the ramp signal 812 is the signal 526, which is restored to $V_{refa}$ according to Equation 5 when the demagnetization process starts. According to another embodiment, after the demagnetization process is completed, the ramp signal 812 increases exponentially. If the ramp signal 812 becomes higher than the amplified signal 862 in magnitude, a comparison signal 872 is at a logic high level (e.g., at the "1" level), and the switch 820 is turned on.

As shown in FIG. 8, the compensation current generator 802 receives the signals 814 and generate a compensation current 804 based on at least information associated with the signals 814. In one embodiment, the compensation current 804 flows out of the controller chip 898 through the terminal 832 and then flows to the ground through the resistor 848. In another embodiment, the feedback voltage at the terminal 832 is adjusted by the compensation current 804.

Figure 9:
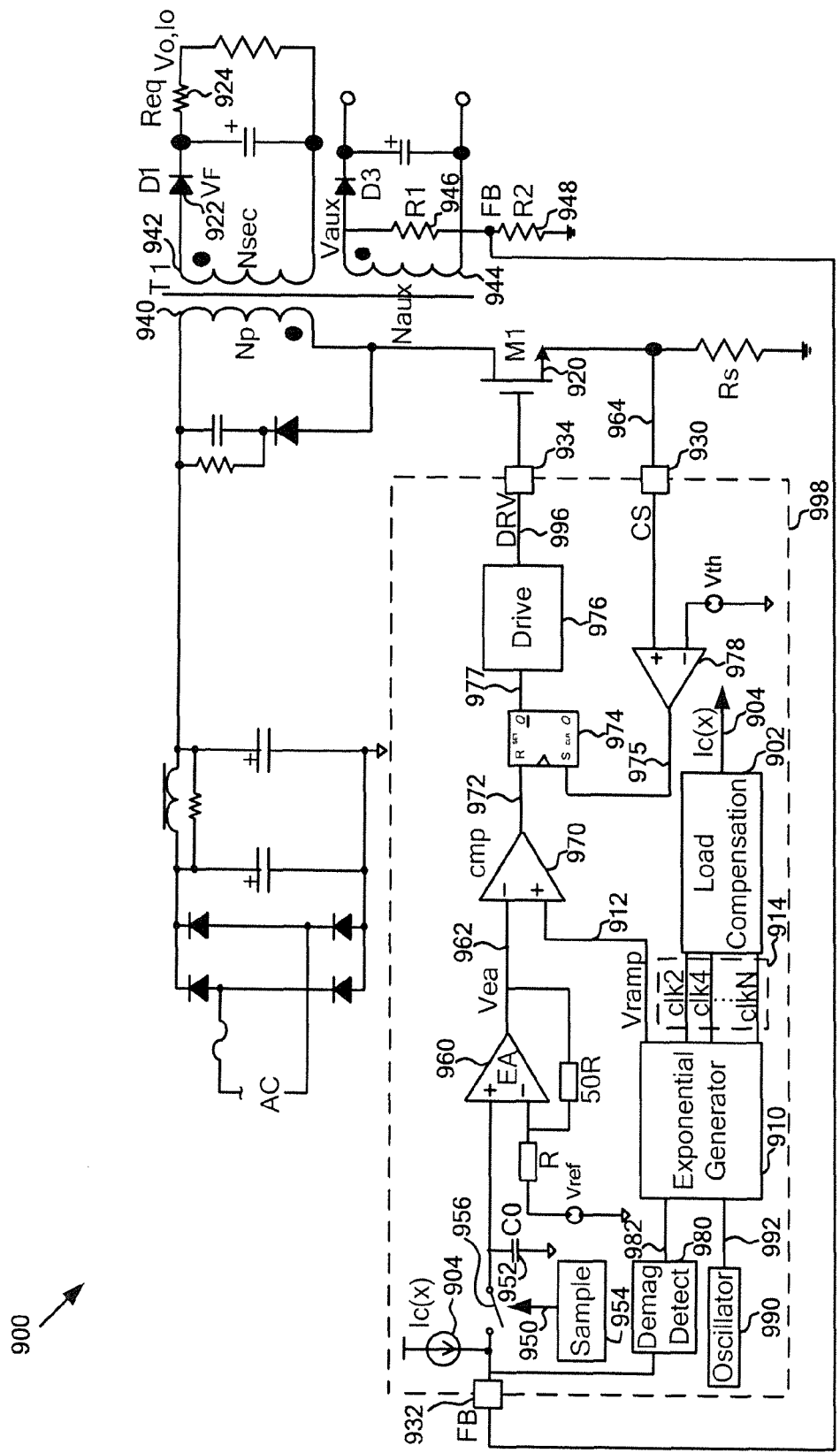
FIG. 9 is a simplified diagram showing a flyback power conversion system with non-linear compensation according to another embodiment of the present invention.

FIG. 9 is a simplified diagram showing a flyback power conversion system with non-linear compensation according to another embodiment of the present invention. This diagram is merely an example, which should not unduly limit the scope of the claims. One of ordinary skill in the art would recognize many variations, alternatives, and modifications.

The power conversion system 900 includes an exponential generator 910, a switch 920, a primary winding 940, a secondary winding 942, an auxiliary winding 944, a capacitor 952, a sampling controller 954, a sampling switch 956, an error amplifier 960, comparators 970 and 978, a flip-flop component 974, and a gate driver 976, a demagnetization detector 980, an oscillator 990, terminals 930, 932, and 934, a compensation current generator 902, resistors 946 and 948, a diode 922, and an equivalent resistor 924 for an output cable. For example, the terminals 930, 932, and 934 are terminals for a controller chip 998. In another example, the switch 920 is a MOS transistor. In yet another example, the exponential generator 910 is the exponential generator 500. According to one embodiment, signals 982, 992, 912 are the signal 542, 532, and 526 respectively, and signals 914 are the signals 554.

As shown in FIG. 9, the demagnetization detector 980 outputs a signal 982 to the exponential generator 910, and the oscillator 990 also outputs a signal 992 to the exponential generator 910. In one embodiment, the switch 920 is controlled by a signal 996 through the terminal 934. In another embodiment, a signal 964 for sensing a current that flows through the primary winding 940 is received by the terminal 930. For example, the signal 964 is received by the comparator 978, which compares the signal 964 with a threshold voltage $V_{th}$ (e.g., 0.5V) and generates a signal 975.

In another example, when the switch 920 is turned on, the transformer stores energy. According to one embodiment, the current flowing through the primary winding 940 ramps up linearly, and the current-sensing voltage at the terminal 930 also ramps up linearly. According to another embodiment, when the current-sensing voltage reaches a threshold for over-current protection (OCP), such as 0.5 V, the switch 920 is turned off.

In yet another example, when the switch 920 is turned off, the energy stored in the transformer is released to the output terminal. According to one embodiment, the demagnetization process starts, and the current flowing through the secondary winding 942 ramps down linearly. For example, when the demagnetization process almost ends and the current flowing through the secondary winding 942 approaches zero, a sampling signal 950 is generated by the sampling controller 954 to sample the feedback voltage at the terminal 932 by closing the sampling switch 956. In another example, after the sampling process is completed, the sampling switch 956 is open in response to the sampling signal 950. In yet another example, the sampled voltage is held on the capacitor 952, and compared with a reference voltage $V_{ref}$, such as 2V. The difference between the sampled/held voltage and the reference voltage $V_{ref}$ is amplified by the error amplifier 960 to generate an amplified signal 962 according to an embodiment. According to another embodiment, the amplified signal 962 is received by the negative input terminal of the comparator 970, whose output signal 972 is used to generate the signal 996. For example, the output signal 972 is received by the flip-flop component 974, which also receives the signal 975 from the comparator 978. In another example, the flip-flop component 974 generates a signal 977 based on at least information associated with the signals 972 and 975. In yet another example, the gate driver 976 receives the signal 977 and generates the signal 996.

In yet another example, when the demagnetization process starts, a ramp signal 912 of the exponential generator 910 is restored to an initial value. According to one embodiment, the ramp signal 912 is the signal 526, which is restored to $V_{refa}$ according to Equation 5 when the demagnetization process starts. According to another embodiment, after the demagnetization process is completed, the ramp signal 912 increases exponentially. If the ramp signal 912 becomes higher than the amplified signal 962 in magnitude, a comparison signal 972 is at a logic high level (e.g., at the "1" level), and the switch 920 is turned on.

As shown in FIG. 9, the compensation current generator 902 receives the signals 914 and generate a compensation current 904 based on at least information associated with the signals 914. In one embodiment, the compensation current 904 flows out of the controller chip 998 through the terminal 932 and then flows to the ground through the resistor 948. In another embodiment, the feedback voltage at the terminal 932 is adjusted by the compensation current 904.

Referring to FIG. 8 or 9, according to some embodiments of the non-linear compensation, the compensation current 804 or 904 is provided to the terminal 832 or 932 respectively. For example, the compensation current 804 or 904 depends on the output current and flows out of the controller chip 898 or 998 through the terminal 832 or 932 respectively. In another example, the compensation current 804 or 904 is used to cancel out the change in the output voltage as a function of the output current due to the resistance of the output cable.

In one embodiment, with the compensation current 804 or 904, the following ran be obtained $$V_{FB} = \frac{R_2}{R_1 + R_2} \times V_{aux} + I_c \times R_2 = \qquad \text{(Equation 21)}$$
$$\frac{R_2}{R_1 + R_2} \times n \times (V_o + V_F + I_o \times R_{eq}) + I_c \times R_2$$

and $V_{FB} = V_{ref}$ (Equation 22)

where $V_{FB}$ represents a voltage at the terminal 832 or 932, and $V_{aux}$ represents the voltage of the auxiliary winding 844 or 944. $R_1$ represents the resistance value of the resistor 846 or 946, and $R_2$ represents the resistance value of the resistor 848 or 948. $I_c$ represents the magnitude of the compensation current 804 or 904. Additionally, n represents a turns ratio between the auxiliary winding 844 or 944 and the secondary winding 842 or 942. $V_o$ and $I_o$ represent the output voltage and the output current respectively. Moreover, $V_F$ represents the forward voltage of the diode 822 or 922, and $R_{eq}$ represents the resistance value of the equivalent resistor 824 or 924.

Using Equations 21 and 22, if $$\frac{R_2}{R_1 + R_2} \times n \times I_o \times R_{eq} + I_c \times R_2 = 0 \qquad \text{(Equation 23)}$$

then $V_o = \frac{R_1 + R_2}{R_2} \times \frac{V_{ref}}{n} - V_F$ (Equation 24)

Hence, if Equation 23 is satisfied, the output voltage is independent of the output current according to certain embodiments.

From Equation 23, the following can be obtained:

$$I_c = -\frac{R_{eq}}{R_1 + R_2} \times n \times I_o \qquad \text{(Equation 25)}$$

According to some embodiments, the negative sign in Equation 25 indicates the compensation current 804 or 904 flows out of the controller chip 898 or 998 through the terminal 832 or 932 and then flows to the ground through the resistor 848 or 948 respectively.

According to certain embodiments, for the flyback power conversion system 800 or 900, the following can be obtained in the discontinuous conduction mode (DCM).

$$I_o = \frac{1}{2} \times \frac{L \times I_p^2 \times \eta}{(c+1) \times V_o \times T_s} \qquad \text{(Equation 26)}$$

where L represents the conductance of the primary winding 840 or 940, and $I_p$ represents the peak current of the primary winding 840 or 940. η represents the conversion efficiency of the system 800 or 900. Additionally, $V_o$ and $I_o$ represent the output voltage and the output current respectively. Moreover, $T_s$ represents the switching period of the switch 820 or 920, and c represents the ratio of the consumption power of the controller chip 898 or 998 to the output power of the system 800 or 900, as follows:

$$T_s = \frac{1}{F_s} \qquad \text{(Equation 27)}$$

$$\text{and } c = \frac{P_c}{P_o} \qquad \text{(Equation 28)}$$

where $F_s$ represents the switching frequency of the switch 820 or 920. Additionally, $P_c$ represents the consumption power of the controller chip 898 or 998, and $P_o$ represents the output power of the system 800 or 900 as follows:

$$P_o = V_o \times I_o \qquad \text{(Equation 29)}$$

With Equation 26, Equation 25 can be transformed to $$I_c = -\frac{1}{2} \times \frac{R_{eq}}{R_1 \times R_2} \times n \times \frac{L \times I_p^2 \times \eta}{(c+1) \times V_o \times T_s} \qquad \text{(Equation 30)}$$

In some embodiments, for a given power conversion system 300 or 400, $R_{eq}$, n, L, $I_p$, and η are constants. Additionally, if the output voltage $V_o$ remains constant, the following constant m can be obtained:

$$m = \frac{1}{2} \times R_{eq} \times n \times \frac{L \times I_p^2 \times \eta}{V_o} \qquad \text{(Equation 31)}$$

Consequently, Equation 30 is transformed to $$I_c = -m \times \frac{1}{c+1} \times \frac{1}{T_s} \times \frac{1}{R_1 + R_2} \qquad \text{(Equation 32)}$$

For example, based on Equation 32, the magnitude $I_c$ of the compensation current can be adjusted by $R_1$ and/or $R_2$. In another example, c is inversely proportional to the output power $P_o$, and the output power $P_o$ is inversely proportional to $T_s$, so c is proportional to $T_s$. In yet another example, if c is much smaller than 1 (e.g., if the consumption power of the controller chip 898 or 998 can be neglected), $I_c$ is inversely proportional to the switching period $T_s$. In yet another example, if c is larger than 0.1 (e.g., if the consumption power of the controller chip 898 or 998 can no longer be neglected), the cross regulation between the consumption power of the controller chip 898 or 998 and the output power of the system 800 or 900 starts to affect the regulation of the output voltage $V_o$, so the $I_c$ is inversely proportional to c+1 according to Equation 32.

According to certain embodiments, in the constant-voltage (CV) mode with primary-side regulation and the pulse-frequency modulation (PFM), the switching period $T_s$ for the system 800 or 900 is equal to $t_{ON}+t_{Demag}+t_{ramp}$. $t_{ON}$ represents the time period when the switch 820 or 920 remains turned on, $t_{Demag}$ represents the time period of the demagnetization process, and $t_{ramp}$ represents the time period for the signal 812 or 912 to rise to the level of the signal 862 or 962 in magnitude. For example, $t_{ramp}$ is equal to $n_{ramp} \times T$. In another example, at $n = n_{ramp}$, $V_{ramp}$ is smaller than $V_{refb}$ according to Equation 5, where n represents the time for the signal 812 or 912 to rise in terms of the number of the clock periods. In yet another example, n×T is represented by the signals 814 or 914. T represents the clock period of the clock signal 892 or 992. In another example, the switching period $T_s$ for the system 800 or 900 is $$T_s = t_{ON} + t_{Demag} + n_{ramp} \times T \qquad \text{(Equation 33)}$$

According to some embodiments, with Equation 33, Equation 32 can be transformed to $$I_c(n_{ramp} \times T) = -m \times \frac{1}{c+1} \times \frac{1}{t_a + n_{ramp} \times T} \times \frac{1}{R_1 + R_2} \qquad \text{(Equation 34)}$$

where $t_a = t_{ON} + t_{Demag}$ (Equation 35)

According to some embodiments, the negative sign in Equation 34 indicates the compensation current 804 or 904 flows out of the controller chip 898 or 998 through the terminal 832 or 932 and then flows to the ground through the resistor 848 or 948 respectively. For example, $t_a$ is approximately constant. In another example, $I_c$ decreases in magnitude with increasing $n_{ramp} \times T$, and $n_{ramp} \times T$ is equal to $t_{ramp}$.

Figure 10:
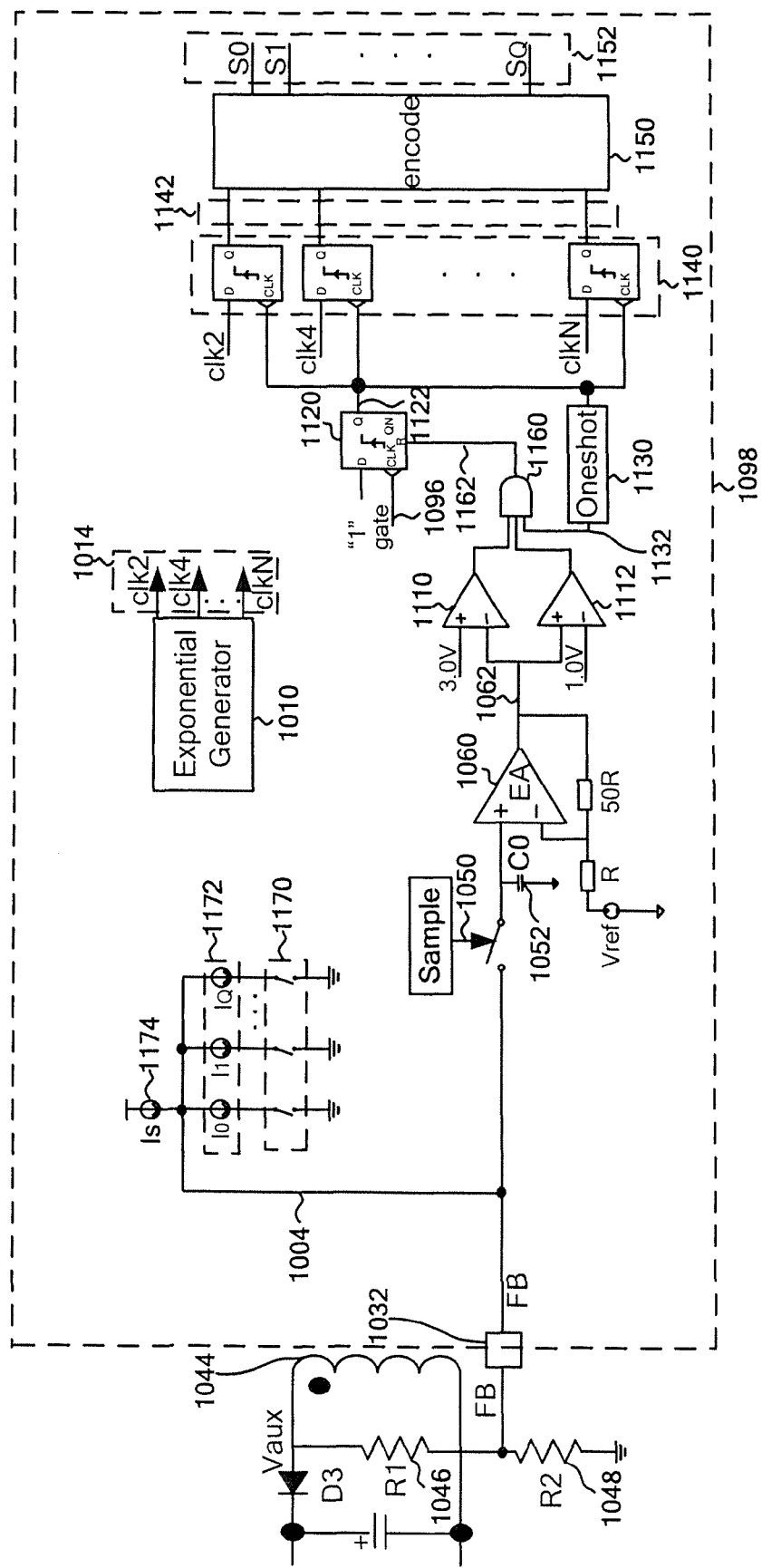
FIG. 10 is a simplified diagram showing a compensation current generator for the flyback power conversion system with non-linear compensation according to an embodiment of the present invention.

FIG. 10 is a simplified diagram showing a compensation current generator for the flyback power conversion system 800 or 900 with non-linear compensation according to an embodiment of the present invention. This diagram is merely an example, which should not unduly limit the scope of the claims. One of ordinary skill in the art would recognize many variations, alternatives, and modifications. The compensation current generator includes comparators 1110 and 1112, a flip-flop component 1120, a signal generator 1130, flip-flop components 1140, an encoding component 1150, an AND gate 1160, switches 1170, current sinks 1172, and a current source 1174.

As shown in FIG. 10, a compensation current generator receives the signals 1014 and generate a compensation current 1004 based on at least information associated with the signals 1014. In one embodiment, a terminal 1032 is the same as the terminal 832, a controller chip 1098 is the same as the controller chip 898, components 1010, 1044, 1046, 1048, 1052, and 1060 are the same as the components 810, 844, 846, 848, 852, and 860 respectively, and signals 1004, 1014, 1050, 1062, and 1096 are the same as the signals 804, 814, 850, 862, and 896 respectively. In another embodiment, a terminal 1032 is the same as the terminal 932, a controller chip 1098 is the same as the controller chip 998, components 1010, 1044, 1046, 1048, 1052, and 1060 are the same as the components 910, 944, 946, 948, 952, and 960 respectively, and signals 1004, 1014, 1050, 1062, and 1096 are the same as the signals 904, 914, 950, 962, and 996 respectively.

Referring to FIG. 8 or 9, the larger the output current of the power conversion system 800 or 900 is, the shorter $t_{ramp}$ becomes in magnitude according to certain embodiments. For example, $t_{ramp}$ represents the time period for the signal 812 or 912 to rise to the level of the signal 862 or 962 in magnitude. For example, the signal 812 or 912 is the signal 526 generated by the exponential generator 500. The voltage magnitude $V_{ramp}$ of the signal 526 rises until the switch 540 is closed by the signal 542. In another example, at $n = n_{ramp}$, $V_{ramp}$ is smaller than $V_{refb}$ according to Equation 5, where n represents the time for the signal 812 or 912 to rise in terms of the number of the clock periods. In yet another example, n×T is represented by the signals 814 or 914. T represents the clock period of the clock signal 892 or 992.

Returning to FIG. 10, the signal 1062 is received by both comparators 1110 and 1112 according to an embodiment. For example, the comparator 1110 determines whether the voltage magnitude of the signal 1062 is lower than 3V, and the comparator 1112 determines whether the voltage magnitude of the signal 1062 is higher than 1V. In another example, if the voltage magnitude of the signal 1062 is determined to be between 1V and 3V, the power conversion system 800 or 900 is determined to operate in the constant-voltage (CV) mode.

According to one embodiment, if the voltage magnitude of the signal 1062 is determined to be between 1V and 3V, and if a signal 1132 generated by the signal generator 1130 is at a logic high level, the AND gate 1160 sends to a flip-flop component 1120 a signal 1162, which is also at the logic high level. For example, the signal generator 1130 is a one-shot signal generator. In another example, the flip-flop component 1120 also receives at least the signal 1096, and generates a signal 1122 based on at least information associated with the signals 1096 and 1120.

According to another embodiment, the signal 1122 is received by the flip-flop components 1140, which also receive the signals 1014. For example, the signals 1014 represent n×T, where n represents the time since the end of previous $t_{Demag}$ in terms of the number of the clock periods. In another example, the signal 1122 are used to lock signals 1142 so that the signals 1142 reflect the value of n at the end of $t_{ramp}$ immediately before the subsequent $t_{on}$, so the signals 1142 indicates $n_{ramp}$×T.

In response, the flip-flop components 1140 outputs signals 1142 to the encoding component 1150 based on at least information associated with the signals 1014 and 1122. For example, the flip-flop components 1140 include flip-flop components 1140$_2$, 1140$_4$, ..., 1140$_m$, ..., and 1140$_N$, the signals 1014 include the signals clk2, clk4, ..., clkm, ..., and clkN, and the signals 1142 include the signals 1142$_2$, 1142$_4$, ..., 1142$_m$, ..., and 1142$_N$. In one embodiment, m and N are each equal to a power of 2 (e.g., 2 to the power of an integer), with 2≤m≤N. In yet another example, the flip-flop components 1140$_2$, 1140$_4$, ..., 1140$_m$, ..., and 1140$_N$ receive at least the signals clk2, clk4, ..., clkm, ..., and clkN respectively and generates the signals 1140$_2$, 1140$_4$, ..., 1140$_m$, ..., and 1140$_N$ respectively.

According to one embodiment, if at the rising edge of the signal 1122, the signal clkm is at a logic high level (e.g., at the "1" level), the signal 1140$_m$ is also at the logic high level (e.g., at the "1" level), with 2≤m≤N. According to another embodiment, if at the rising edge of the signal 1122, the signal clkm is at a logic low level (e.g., at the "0" level), the signal 1140$_m$ is also at the logic low level (e.g., at the "0" level), with 2≤m≤N.

As shown in FIG. 10, the encoding component 1150 performs digital encoding based on information associated with the signals 1142 and generate signals 1152, which are used to determine the magnitude of the compensation current 1004 according to one embodiment of the present invention. For example, the compensation current 1004 has a non-linear relationship with $n_{ramp}$×T according to Equation 34. In another example, the compensation current 1004 has a non-linear relationship with the output current, and changes with the output current. In yet another example, the signals 1152 includes signals $S_0$, $S_1$, ..., $S_q$, ..., and $S_Q$. Both q and Q are integers, with 0≤q≤Q.

According to some embodiments, the signals 1152 are used to control the switches 1170. For example, the switches 1170 include switches 1170$_0$, 1170$_1$, ..., 1170$_q$, ..., and 1170$_Q$. Both q and Q are integers, with 0≤q≤Q. In another example, the switches 1170$_0$, 1170$_1$, ..., 1170$_q$, ..., and 1170$_Q$ are controlled by the signals $S_0$, $S_1$, ..., $S_q$, ..., and $S_Q$ respectively. In one embodiment, if the signal $S_q$ is at a logic high level (e.g., the "1" level), the switch 1170$_q$ is closed. In another embodiment, if the signal $S_q$ is at a logic low level (e.g., the "0" level), the switch 1170$_q$ is open.

According to certain embodiments, the switches 1170 are connected to the current sinks 1172. For example, the current sinks 1172 include current sinks $I_0$, $I_1$, ..., $I_q$, ..., and $I_Q$. Both q and Q are integers, with 0≤q≤Q. In another example, the switches 1170$_0$, 1170$_1$, ..., 1170$_q$, ..., and 1170$_Q$ are connected to the current sinks $I_0$, $I_1$, ..., $I_q$, ..., and $I_Q$ respectively. In one embodiment, if the switch 1170$_q$ is closed, the current sink $I_q$ affects the compensation current 1004. In another embodiment, if the switch 1170$_q$ is open, the current sink $I_q$ does not affect the compensation current 1004.

In one embodiment, the encoding component 1150 performs a segmented curve fitting process to approximately implement Equation 34 with other components of the compensation current generator. In another embodiment, the following 6-segment curve fitting process is performed with the current source 1174 providing a current $I_s$ that is equal to 44 µA:

Segment 1: $I_c(n_{ramp}×T)=0-44=-44$ (µA) if $n_{ramp}×T<16×T$ according to one embodiment. For example, when the clkj signals (32≤j≤N) are all at the logic low level (e.g., the "0" level), the signals $S_0$, $S_1$, ..., $S_q$, ..., and $S_Q$ are all at the logic low level (e.g., the "0" level) with Q equal to 15.

Segment 2:

$$I_c(n_{ramp} \times T) = \frac{1}{2} \times (n_{ramp} \times T - 16 \times T) - 44 \ (\mu A)$$

if 16×T≤$n_{ramp}$×T<32×T according to one embodiment. For example, when the clk32 signal changes to the logic high level (e.g., the "1" level), and the clkj signals (64≤j≤N) all remain at the logic low level (e.g., the "0" level), the signals $S_0$, $S_1$, $S_2$, and $S_3$ change to the logic high level (e.g., the "1" level) sequentially with an interval of 2×T. In another example, the magnitudes of the current sinks $I_0$, $I_1$, $I_2$, and $I_3$ are each equal to 1 µA.

Segment 3:

$$I_c(n_{ramp} \times T) = \frac{1}{8} \times (n_{ramp} \times T - 32 \times T) + 8 - 44 \ (\mu A)$$

if 32×T≤$n_{ramp}$×T<128×T according to one embodiment. For example, when the clk128 signal changes to the logic high level (e.g., the "1" level), and the clkj signals (256≤j≤N) all remain at the logic low level (e.g., the "0" level), the signals $S_4$, $S_5$, $S_6$, and $S_7$ change to the logic high level (e.g., the "1" level) sequentially with an interval of 8×T, with the signals $S_0$, $S_1$, $S_2$, and $S_3$ remaining at the logic high level (e.g., the "1" level). In another example, the magnitudes of the current sinks $I_4$, $I_5$, $I_6$, and $I_7$ are each equal to 1 µA.

Segment 4:

$$I_c(n_{ramp} \times T) = \frac{0.75}{32} \times (n_{ramp} \times T - 128 \times T) + 20 - 44 \ (\mu A)$$

if $128 \times T \leq n_{ramp} \times T < 512 \times T$ according to one embodiment. For example, when the clk512 signal changes to the logic high level (e.g., the "1" level), and the clkj signals ($1024 < j \leq N$) all remain at the logic low level (e.g., the "0" level), the signals $S_8$, $S_9$, $S_{10}$, and $S_{11}$ change to the logic high level (e.g., the "1" level) sequentially with an interval of $32 \times T$, with the signals $S_0, S_1, \ldots,$ and $S_7$ remaining at the logic high level (e.g., the "1" level). In another example, the magnitudes of the current sinks $I_8$, $I_9$, $I_{10}$, and $I_{11}$ are each equal to 0.75 µA.

Segment 5:

$$I_c(n_{ramp} \times T) = \frac{1.25}{128} \times (n_{ramp} \times T - 512 \times T) + 29 - 44 \ (\mu A)$$

if $512 \times T \leq n_{ramp} \times T < 2048 \times T$ according to one embodiment. For example, when the clk64 signal changes to the logic high level (e.g., the "1" level), and the clkj signals ($2048 < j \leq N$) all remain at the logic low level (e.g., the "0" level), the signals $S_{12}$, $S_{13}$, $S_{14}$, and $S_{15}$ change to the logic high level (e.g., the "1" level) sequentially with an interval of $128 \times T$, with the signals $S_0, S_1, \ldots,$ and $S_{11}$ remaining at the logic high level (e.g., the "1" level). In another example, the magnitudes of the current sinks $I_8$, $I_9$, $I_{10}$, and $I_{11}$ are each equal to 1.25 µA.

Segment 6: $I_c(n_{ramp} \times T) = 44 - 44 = 0$ (µA) if $2048 \times T < n_{ramp} \times T$ according to one embodiment. For example, when the clk4096 signal changes to the logic high low level (e.g., the "1" level), the signals $S_0, S_1, \ldots, S_q, \ldots,$ and $S_Q$ are all at the logic high level (e.g., the "1" level) with Q equal to 15.

According to some embodiments, as discussed above, the negative value of $I_c$ indicates the compensation current 1004 flows out of the controller chip 1098 through the terminal 1032 and then flows to the ground through the resistor 1048 respectively. For example, the absolute value of $I_c$ represents the magnitude of the compensation current 1004. In another example, the magnitude of the compensation current 1004 decreases with increasing $n_{ramp} \times T$. In yet another example, the magnitude of the compensation current 1004 decreases with increasing $t_{ramp}$.

According to certain embodiments, if the voltage magnitude of the signal 1062 stays between 1V and 3V for $8 \times T$, the power conversion system 800 or 900 is determined to operate with stability in the constant voltage (CV) mode. For example, in response, the compensation current generator uses the signal 1122 to control the flip-flop components 1142 in order to store the signals 1014 that indicate the $t_{ramp}$ magnitude of $n_{ramp} \times T$. In another example, the signal 1142 is received by the encoding component 1150, which performs a digital encoding process and generates the signals 1152. In yet another example, the signals 1152 are used to control the switches 1170 connected to the current sinks 1172, and to determine the magnitude of the compensation current 1004.

In one embodiment, only when the power conversion system 800 or 900 is determined to operate with stability in the constant voltage (CV) mode, the compensation current 1004 changes with the switching period $T_s$. In another embodiment, the encoding component 1150 uses the method of segmented curve fitting to realize the compensation current 1004 as a non-linear function of $n_{ramp} \times T$ and c as shown in Equation 34.

Figure 11:
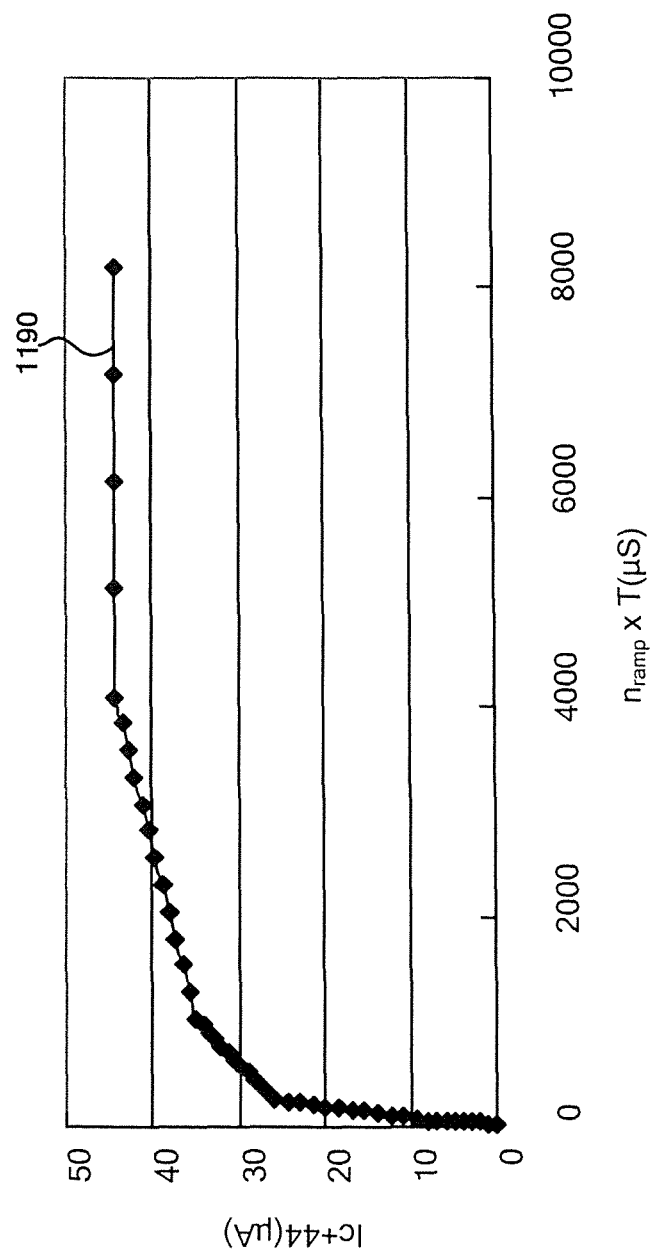
FIG. 11 is a simplified diagram showing the compensation current generated by the compensation current generator as shown in FIG. 10 as a function of $n_{ramp} \times T$ according to an embodiment of the present invention.

FIG. 11 is a simplified diagram showing the compensation current generated by the compensation current generator as shown in FIG. 10 as a function of $n_{ramp} \times T$ according to an embodiment of the present invention. This diagram is merely an example, which should not unduly limit the scope of the claims. One of ordinary skill in the art would recognize many variations, alternatives, and modifications. The curve 1190 represents the sum of compensation current and 44 µA as a function of $n_{ramp} \times T$, which is consistent with Equation 34.

Figure 12:
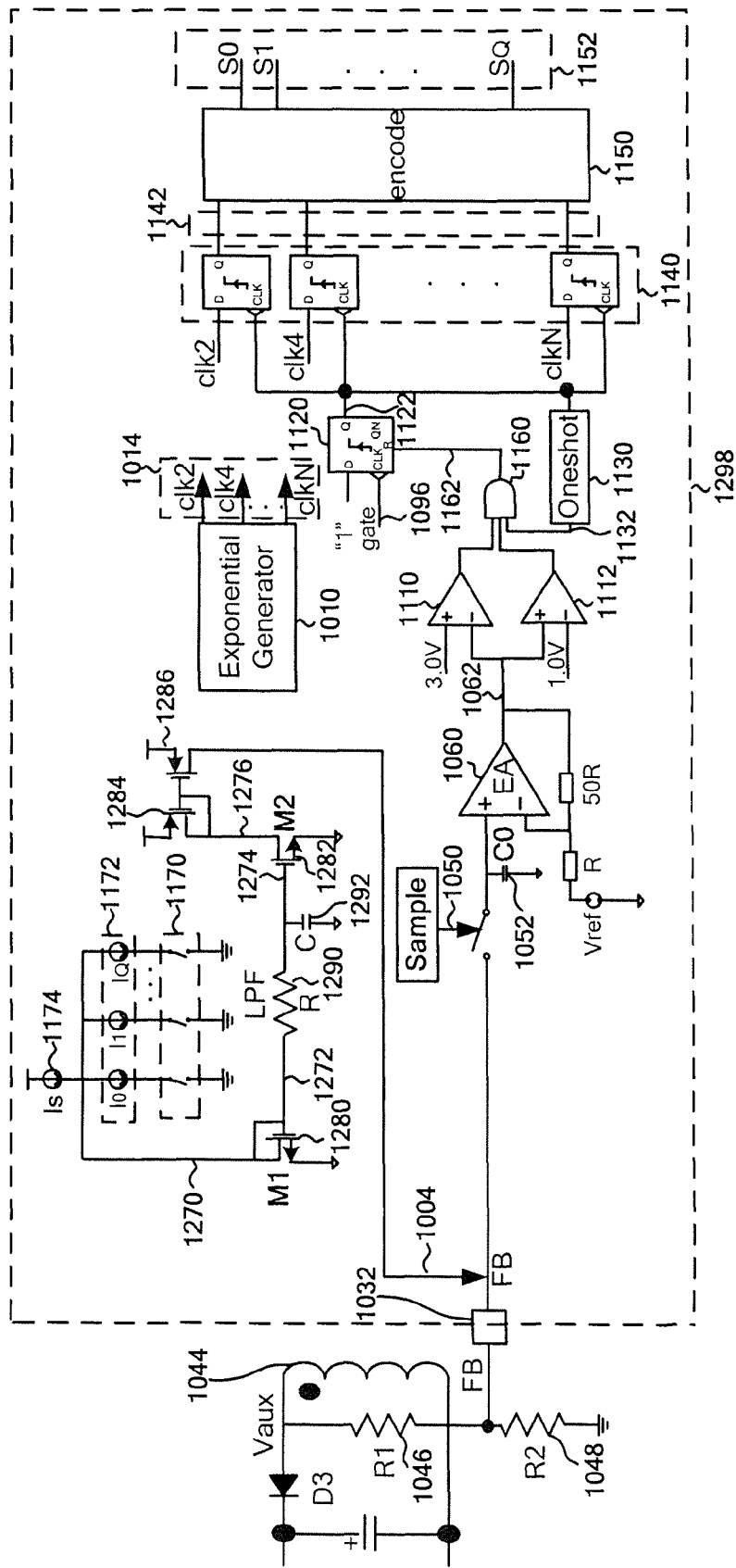
FIG. 12 is a simplified diagram showing a compensation current generator for the flyback power conversion system with non-linear compensation according to another embodiment of the present invention.

FIG. 12 is a simplified diagram showing a compensation current generator for the flyback power conversion system 800 or 900 with non-linear compensation according to another embodiment of the present invention. This diagram is merely an example, which should not unduly limit the scope of the claims. One of ordinary skill in the art would recognize many variations, alternatives, and modifications. The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1280, 1282, 1284, and 1286, a resistor 1290, and a capacitor 1292. As shown, both the resistor 1290, and the capacitor 1292 are on a controller chip 1298.

Figure 13:
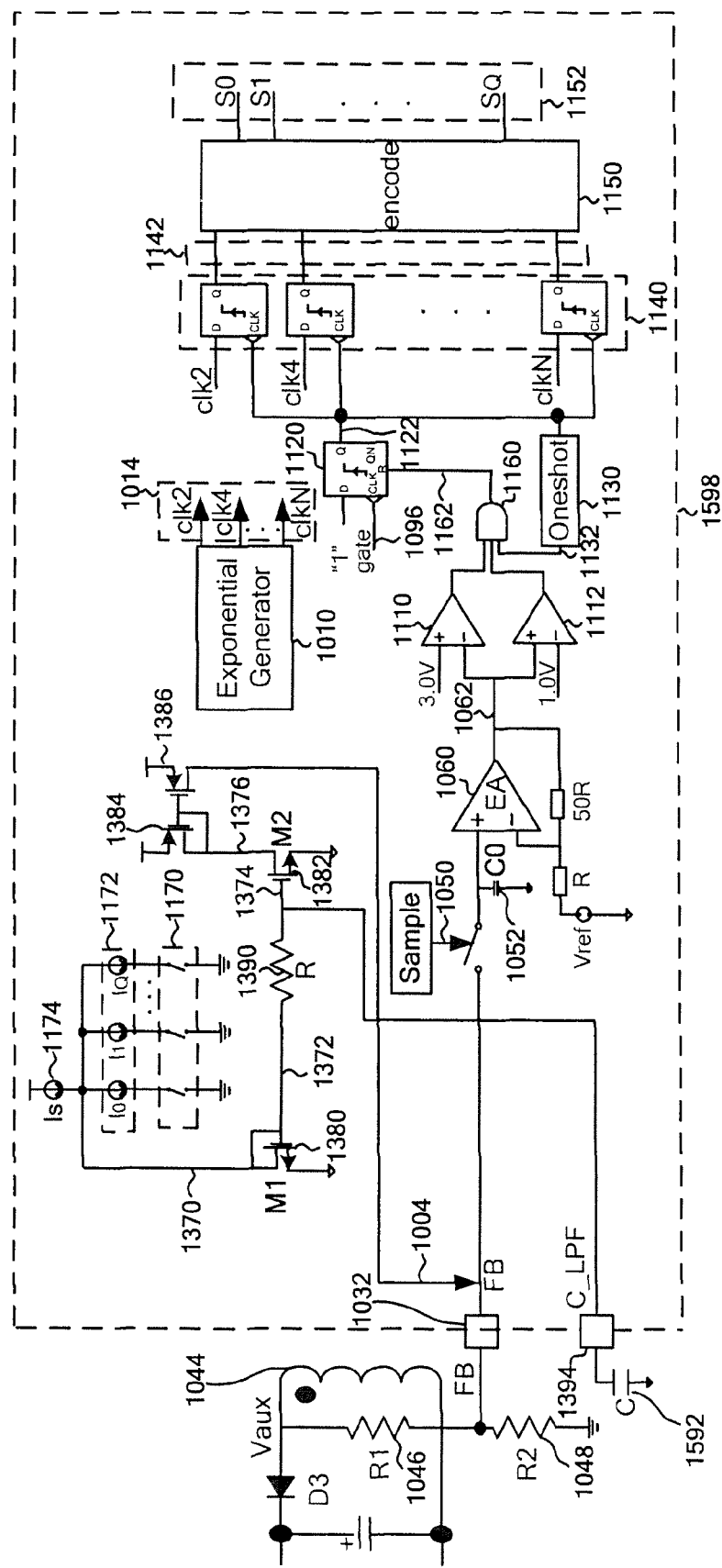
FIG. 13 is a simplified diagram showing a compensation current generator for the flyback power conversion system with non-linear compensation according to yet another embodiment of the present invention.

FIG. 13 is a simplified diagram showing a compensation current generator for the flyback power conversion system 800 or 900 with non-linear compensation according to yet another embodiment of the present invention. This diagram is merely an example, which should not unduly limit the scope of the claims. One of ordinary skill in the art would recognize many variations, alternatives, and modifications. The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1380, 1382, 1384, and 1386, a resistor 1390, and a capacitor 1392. As shown, the resistor 1390 is on a controller chip 1398, but the capacitor 1392 is not on the controller chip 1298. For example, the capacitor 1392 is connected to the resistor 1390 through a terminal 1394.

According to some embodiments, the compensation current generator as shown in FIG. 12 or 13 outputs the compensation current 1004 as a non-linear function of $n_{ramp} \times T$, which is an approximation to Equation 34. According to certain embodiments, the compensation current 1004 is filtered by a low pass filter (LPF) such that the change in the compensation current 1004 due to any abrupt change in the switching period $T_s$ can be smoothed out, according to certain embodiments. For example, the low pass filter (LPF) includes the resistor 1290 and the capacitor 1292, or the resistor 1390 and the capacitor 1392. In another example, the transistor 1280 converts a current 1270 to a voltage 1272 for low-pass filtering, the transistor 1282 converts a filtered voltage 1274 to another voltage 1276, and the transistors 1284 and 1286 convert the voltage 1276 to the compensation current 1004 as shown in FIG. 12. In yet another example, the transistor 1380 converts a current 1370 to a voltage 1372 for low-pass filtering, the transistor 1382 converts a filtered voltage 1374 to another voltage 1376, and the transistors 1384 and 1386 convert the voltage 1376 to the compensation current 1004 as shown in FIG. 13.

Figure 14:
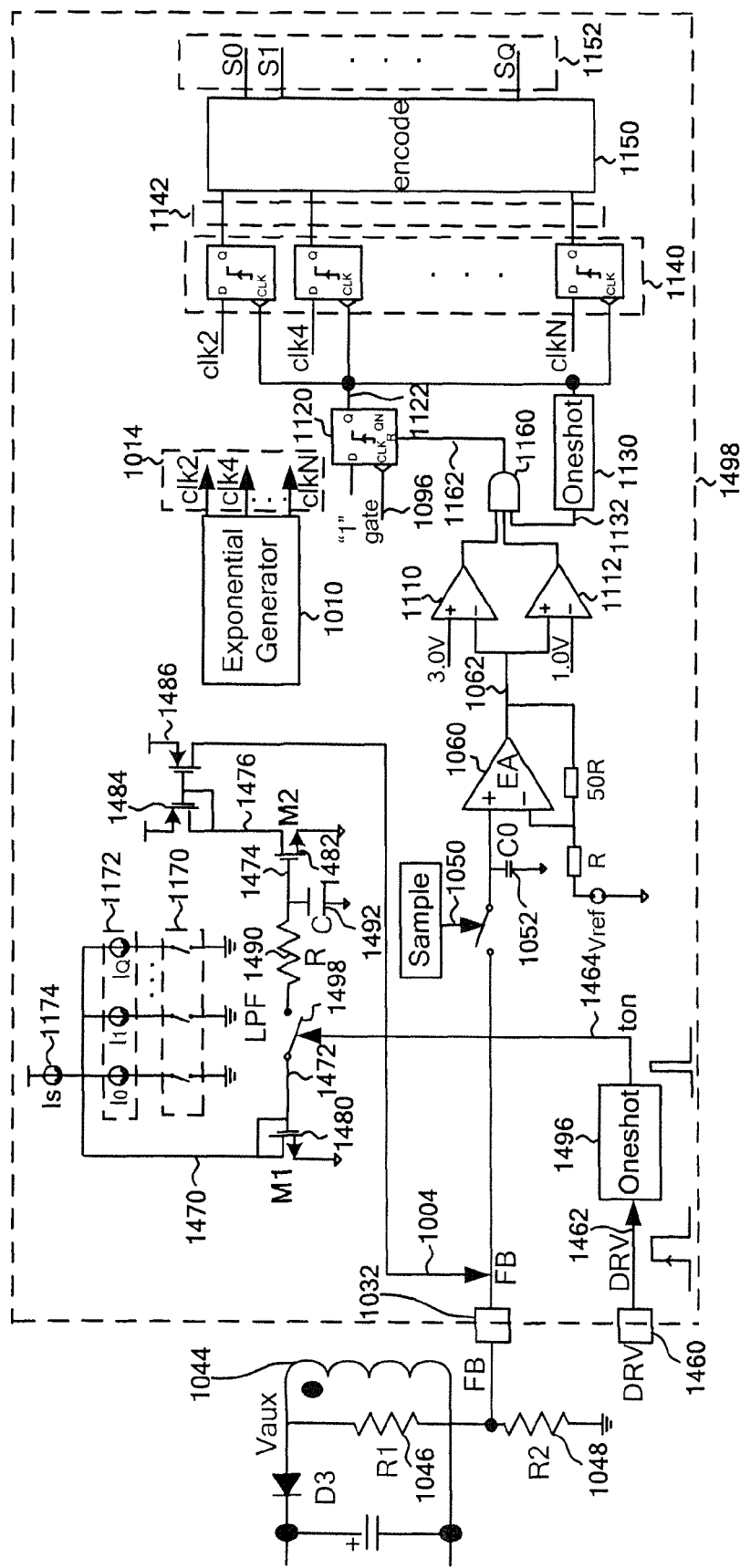
FIG. 14 is a simplified diagram showing a compensation current generator for the flyback power conversion system with non-linear compensation according to yet another embodiment of the present invention.

FIG. 14 is a simplified diagram showing a compensation current generator for the flyback power conversion system 800 or 900 with non-linear compensation according to yet another embodiment of the present invention. This diagram is merely an example, which should not unduly limit the scope of the claims. One of ordinary skill in the art would recognize many variations, alternatives, and modifications. The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1480, 1482, 1484, and 1486, a resistor 1490, a capacitor 1492, a signal generator 1496, and a switch 1498. For example, both the resistor 1490 and the capacitor 1492 are on a controller chip 1498.

As shown in FIG. 14, the signal generator 1496 receives a signal 1462 from a terminal 1460, and generates a signal 1464. For example, the terminal 1460 is the terminal 834 or 934, and the signal 1462 is the signal 896 or 996. In another example, the signal generator 1496 is a one-shot signal generator, which is triggered by the rising edge of the signal 1462 and generates the signal 1464 with a predetermined pulse width. In another embodiment, the switch 1498 is controlled by the signal 1464. For example, if the signal 1464 is at a logic high level (e.g., the "1" level), the switch 1498 is closed. In another example, if the signal 1464 is at a logic low level (e.g., the "0" level), the switch 1498 is open.

Figure 15:
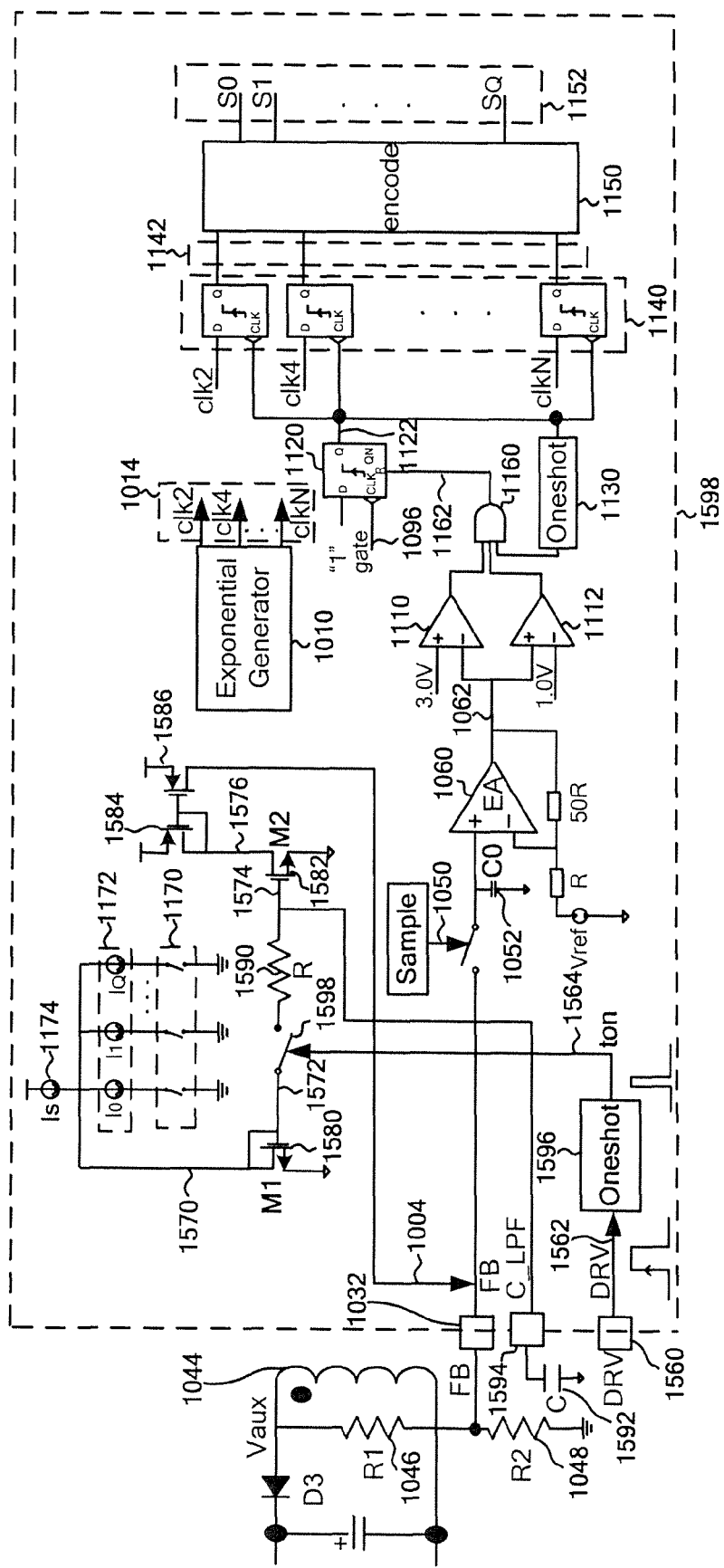
FIG. 15 is a simplified diagram showing a compensation current generator for the flyback power conversion system with non-linear compensation according to yet another embodiment of the present invention.

FIG. 15 is a simplified diagram showing a compensation current generator for the flyback power conversion system 800 or 900 with non-linear compensation according to yet another embodiment of the present invention. This diagram is merely an example, which should not unduly limit the scope of the claims. One of ordinary skill in the art would recognize many variations, alternatives, and modifications. The compensation current generator includes the comparators 1110 and 1112, the flip-flop component 1120, the signal generator 1130, the flip-flop components 1140, the encoding component 1150, the AND gate 1160, the switches 1170, the current sinks 1172, and the current source 1174. Additionally, the compensation current generator also includes transistors 1580, 1582, 1584, and 1586, a resistor 1590, a capacitor 1592, a signal generator 1596, and a switch 1598. For example, the resistor 1590 is on a controller chip 1598, but the capacitor 1592 is not on the controller chip 1598. In another example, the capacitor 1592 is connected to the resistor 1590 through a terminal 1594.

As shown in FIG. 15, the signal generator 1596 receives a signal 1562 from a terminal 1560, and generates a signal 1564. For example, the terminal 1560 is the terminal 834 or 934, and the signal 1562 is the signal 896 or 996. In another example, the signal generator 1596 is a one-shot signal generator, which is triggered by the rising edge of the signal 1562 and generates the signal 1564 with a predetermined pulse width. In another embodiment, the switch 1598 is controlled by the signal 1564. For example, if the signal 1564 is at a logic high level (e.g., the "1" level), the switch 1598 is closed. In another example, if the signal 1564 is at a logic low level (e.g., the "0" level), the switch 1598 is open.

According to some embodiments, the compensation current generator as shown in FIG. 14 or 15 outputs the compensation current 1004 as a non-linear function of $n_{ramp} \times T$, which is an approximation to Equation 34. According to certain embodiments, the compensation current 1004 is filtered by a low pass filter (LPF) such that the change in the compensation current 1004 due to any abrupt change in the switching period $T_s$ can be smoothed out, according to certain embodiments. For example, the low pass filter (LPF) includes the resistor 1490, the capacitor 1492, the signal generator 1496, and the switch 1498. In another example, the low pass filter (LPF) includes the resistor 1590, the capacitor 1592, the signal generator 1596, and the switch 1598.

According to one embodiment, the signal generator 1496 or 1596 is a one-shot signal generator, which is triggered by the rising edge of the signal 1462 or 1562, and generates the signal 1464 or 1564 with a predetermined pulse width. According to another embodiment, the low pass filter (LPF) as shown in FIG. 14 or 15 has an adaptive e constant as follows:

$$\tau = \frac{R \times C}{t_{pulse} \times F_s} \qquad \text{(Equation 36)}$$

where τ represents the time constant of the low pass filter. R represents the resistance value of the resistor 1490 or 1590, and C represents the capacitance value of the capacitor 1492 or 1592, respectively. $F_s$ represents the switch frequency of the signal 1462, and $t_{pulse}$ represents the predetermined pulse width of the signal 1464 or 1564. Based on Equation 36, the time constant of the low pass filter is inversely proportional to the switching frequency (e.g., the switching frequency of the power conversion system 800 or 900) according to certain embodiments. For example, if $F_s$ equals 20 Hz and $t_{pulse}$ equals 300 ns, τ can become 10 times as large as $T_s$ by setting R equal to 500 KΩ and C equal to 6 pF.

In one embodiment, the transistor 1480 converts a current 1470 to a voltage 1472 for low-pass filtering, the transistor 1482 converts a filtered voltage 1474 to another voltage 1476, and the transistors 1484 and 1486 convert the voltage 1476 to the compensation current 1004 as shown in FIG. 14. In another embodiment, the transistor 1580 converts a current 1570 to a voltage 1572 for low-pass filtering, the transistor 1582 converts a filtered voltage 1574 to another voltage 1576, and the transistors 1584 and 1586 convert the voltage 1576 to the compensation current 1004 as shown in FIG. 15.

As discussed above and further emphasized here, FIG. 10, FIG. 12, FIG. 13, FIG. 14, and FIG. 15 are merely examples, which should not unduly limit the scope of the claims. One of ordinary skill in the art would recognize many variations, alternatives, and modifications. For example, the specific voltage values as shown in these figures can be changes to other values.

According to another embodiment, a system for regulating an output voltage of a power conversion system includes a sampling component located on a chip configured to receive an input voltage through a terminal. The sampling component is configured to sample the input voltage and generate a sampled voltage. Additionally, the system includes an error amplifier configured to process information associated with the sampled voltage and a threshold voltage and generate a first output signal, and a first signal generator configured to generate a second output signal and one or more third output signals. Moreover, the system includes a comparator configured to receive the first output signal and the second output signal and generate a comparison signal, a gate driver directly or indirectly coupled to the comparator and configured to generate a drive signal based on at least information associated with the comparison signal, and a current generator configured to receive at least the one or more third output signals and generate a compensation current flowing out of the chip through the terminal. The gate driver is further coupled to a first switch configured to receive the drive signal and affect a first current flowing through a primary winding coupled to a secondary winding. The secondary winding is associated with at least an output voltage of a power conversion system. The power conversion system includes at least the primary winding, the secondary winding, and an auxiliary winding, and the auxiliary winding is coupled to the secondary winding. The input voltage is associated with at least the auxiliary winding and depends on at least the output voltage and the compensation current. The second output signal starts to increase from a first magnitude at a first time. The one or more third output signals represent a first time period since the first time during which the second output signal increases in magnitude. The compensation current decreases in magnitude if a second time period increases, and the second time period starts from the first time and ends at a second time when the second output signal becomes equal to the first output signal in magnitude. For example, the system is implemented according to FIG. 8, FIG. 9, FIG. 10, FIG. 12, FIG. 13, FIG. 14, and/or FIG. 15.

According to yet another embodiment, a system for regulating an output voltage of a power conversion system includes a sampling component located on a chip configured to receive an input voltage through a terminal. The sampling component is configured to sample the input voltage and generate a sampled voltage. Additionally, the system includes an error amplifier configured to process information associated with the sampled voltage and a threshold voltage and generate a first output signal, and a signal generator configured to receive at least an input clock signal with an input clock period and generate a second output signal and one or more output clock signals corresponding to one or more output clock periods respectively. Each of the one or more output clock periods is equal to the input clock period multiplied by an integer larger than 1. Moreover, the system includes a comparator configured to receive the first output signal and the second output signal and generate a comparison signal, and a gate driver directly or indirectly coupled to the comparator and configured to generate a drive signal based on at least information associated with the comparison signal. Also, the system includes a current generator configured to receive at least the one or more output clock signals and generate a compensation current flowing out of the chip through the terminal based on at least information associated with the one or more output clock signals. The gate driver is further coupled to a first switch configured to receive the drive signal and affect a first current flowing through a primary winding coupled to a secondary winding. The secondary winding is associated with at least an output voltage of a power conversion system. The power conversion system includes at least the primary winding, the secondary winding, and an auxiliary winding, and the auxiliary winding is coupled to the secondary winding. The input voltage is associated with at least the auxiliary winding and depends on at least the output voltage and the compensation current. For example, the system is implemented according to FIG. 8, FIG. 9, FIG. 10, FIG. 12, FIG. 13, FIG. 14, and/or FIG. 15.

According to yet another embodiment, a method for regulating an output voltage of a power conversion system includes receiving an input voltage through a terminal of a chip, sampling the input voltage, and generating a sampled voltage based on at least information associated with the input voltage. Additionally, the method includes processing information associated with the sampled voltage and a threshold voltage, generating a first output signal based on at least information associated with the sampled voltage and the threshold voltage, generating a second output signal and one or more third output signals, receiving the first output signal and the second output signal, and generating a comparison signal based on at least information associated with the first output signal and the second output signal. Moreover, the method includes receiving the comparison signal, process information associated with the comparison signal, and generating a drive signal based on at least information associated with the comparison signal to affect a first current flowing through a primary winding coupled to a secondary winding. The secondary winding is associated with at least an output voltage of a power conversion system and coupled to an auxiliary winding of the power conversion system. Also, the method includes receiving at least one or more third output signals, processing information associated with the one or more third output signals, and generating a compensation current flowing out of the chip through the terminal based on at least information associated with the one or more third output signals. The input voltage depends on at least the output voltage and the compensation current. The second output signal starts to increase from a first magnitude at a first time. The one or more third output signals represent a first time period since the first time during which the second output signal increases in magnitude. The compensation current decreases in magnitude if a second time period increases, and the second time period starts from the first time and ends at a second time when the second output signal becomes equal to the first output signal in magnitude. For example, the method is implemented according to FIG. 8, FIG. 9, FIG. 10, FIG. 12, FIG. 13, FIG. 14, and/or FIG. 15.

According to yet another embodiment, a method for regulating an output voltage of a power conversion system includes receiving an input voltage through a terminal of a chip, sampling the input voltage, and generating a sampled voltage based on at least information associated with the input voltage. Additionally, the method includes processing information associated with the sampled voltage and a threshold voltage, generating a first output signal based on at least information associated with the sampled voltage and the threshold voltage, receiving at least an input clock signal with an input clock period, and generating a second output signal and one or more output clock signals based on at least information associated with the input clock signal. The one or more output clock signals correspond to one or more output clock periods respectively, and each of the one or more output clock periods is equal to the input clock period multiplied by an integer larger than 1. Moreover, the method includes receiving the first output signal and the second output signal, generating a comparison signal based on at least information associated with the first output signal and the second output signal, receiving the comparison signal, process information associated with the comparison signal, and generating a drive signal based on at least information associated with the comparison signal to affect a first current flowing through a primary winding coupled to a secondary winding. The secondary winding is associated with at least an output voltage of a power conversion system and coupled to an auxiliary winding of the power conversion system. Also, the method includes receiving at least the one or more output clock signals, processing information associated with the one or more output clock signals, and generating a compensation current flowing out of the chip through the terminal based on at least information associated with the one or more output clock signals. The input voltage depends on at least the output voltage and the compensation current. For example, the method is implemented according to FIG. 8, FIG. 9, FIG. 10, FIG. 12, FIG. 13, FIG. 14, and/or FIG. 15.

Many benefits are achieved by way of the present invention over conventional techniques. Certain embodiments of the present invention provide a digitally-controlled nonlinear load compensation mechanism where the controller chip does not need an external pin for compensation. For example, the nonlinear load compensation mechanism resolves the issues of cross regulation between the consumption power of the controller chip and the output power of the power conversion system. In another example, the cross regulation often results in higher standby power loss and/or poor regulation at no load or light load conditions, but the nonlinear load compensation mechanism can achieve very low standby power loss and/or improve regulation of the output voltage of the power conversion system. Some embodiments of the present invention can reduce cost of the power conversion system. Certain embodiments of the present invention can provide external adjustment for the magnitude of load compensation.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for regulating an output voltage of a power converter, the system comprising:
  a sample-and-hold circuit located on a chip configured to receive an input voltage through a terminal, the sample-and-hold circuit being configured to sample the input voltage, hold the sampled input voltage, and generate a sampled-and-held voltage;
  an error amplifier configured to process information associated with the sampled-and-held voltage and a threshold voltage and generate a first output signal;
  a first signal generator configured to generate a second output signal and one or more third output signals;
  a comparator configured to receive the first output signal and the second output signal and generate a comparison signal;
  a driver coupled to the comparator and configured to generate a drive signal based on at least information associated with the comparison signal; and
  a current generator configured to receive the one or more third output signals and generate a compensation current flowing out of the chip through the terminal;
  wherein:
    the driver is further coupled to a first switch configured to receive the drive signal and affect a first current flowing through a primary winding coupled to a secondary winding;
    the secondary winding is associated with at least an output voltage of a power converter, the power converter including the primary winding, the secondary winding, and an auxiliary winding, the auxiliary winding being coupled to the secondary winding; and
    the input voltage is associated with at least the auxiliary winding and depends on at least the output voltage and the compensation current; wherein:
      the second output signal starts to increase from a first magnitude at a first time;
      the one or more third output signals represent a first time period during which the second output signal increases in magnitude; and
      the compensation current decreases in magnitude in response to a second time period increasing, the second time period starting from the first time and ending at a second time when the second output signal becomes equal to the first output signal in magnitude.

2. The system of claim 1 wherein the second output signal increases exponentially with time during the first time period.

3. The system of claim 1 wherein the second output signal increases exponentially with time during the second time period.

4. The system of claim 1 wherein: the drive signal is associated with a switching period corresponding to a switching frequency; and the compensation current is approximately inversely proportional to the switching period in magnitude, the first time period and the second time period being parts of the switching period.

5. The system of claim 4 wherein the current generator is configured to perform a segmented curve fitting process so that the compensation current is approximately inversely proportional to the switching period in magnitude.

6. The system of claim 1 wherein:
  the first signal generator is further configured to receive an input clock signal associated with an input clock period;
  the one or more third output signals include one or more output clock signals corresponding to one or more output clock periods respectively; and
  each clock period of the one or more output clock periods is equal to the input clock period multiplied by an integer larger than 1.

7. The system of claim 6 wherein the first signal generator is further configured to receive a demagnetization signal from a demagnetization detector.

8. The system of claim 1 wherein:
  the current generator includes an encoder, one or more current sinks, and one or more second switches, the current generator further configured to receive the drive signal;
  the encoder is configured to receive the drive signal and generate one or more control signals based at least in part on the one or more third output signals and the drive signal;
  the one or more second switches are configured to be controlled by the one or more control signals respectively; and
  each current sink of the one or more current sinks is coupled to a corresponding switch selected from the one or more second switches and is configured to affect the compensation current in response to the corresponding switch being closed.

9. The system of claim 8 wherein the current generator further includes a signal filter, the signal filter including a resistor and a capacitor.

10. The system of claim 9 wherein both the resistor and the capacitor are located on the chip.

11. The system of claim 9 wherein the resistor is located on the chip, and the capacitor is not located on the chip.

12. The system of claim 9 wherein: the current generator further includes a second signal generator and a third switch; the second signal generator configured to receive the drive signal and generate a fourth output signal based at least in part on the drive signal to control the third switch; and the third switch is coupled to the signal filter.

13. The system of claim 12 wherein the fourth output signal is associated with a predetermined pulse width.

14. The system of claim 8 wherein the encoder includes:
a first flip-flop configured to receive the drive signal;
one or more second flip-flops coupled to the first flip-flop and configured to receive the one or more third output signals; and
a second signal generator coupled to the one or more second flip-flops and configured to generate the one or more control signals.

15. The system of claim 1 wherein the driver is indirectly coupled to the comparator.

16. The system of claim 1 wherein the first switch includes one selected from a group consisting of a MOS transistor and a bipolar transistor.

17. The system of claim 1 wherein the sample-and-hold circuit includes:
a sampling controller configured to generate a control signal;
a second switch controlled by the control signal; and
a capacitor coupled to the second switch.

18. The system of claim 1 wherein:
the drive signal is associated with a switching period corresponding to a switching frequency; and
the compensation current is inversely proportional to the switching period in magnitude, the first time period and the second time period being parts of the switching period.

19. The system of claim 1 wherein the power converter further includes the first switch.

20. A system for regulating an output voltage of a power converter, the system comprising:
a sample-and-hold circuit located on a chip configured to receive an input voltage through a terminal, the sample-and-hold circuit being configured to sample the input voltage, hold the sampled input voltage, and generate a sampled-and-held voltage;
an error amplifier configured to process information associated with the sampled-and- held voltage and a threshold voltage and generate a first output signal;
a signal generator configured to receive an input clock signal associated with an input clock period, generate a second output signal, and generate one or more output clock signals corresponding to one or more output clock periods respectively, each clock period of the one or more output clock periods being equal to the input clock period multiplied by an integer larger than 1;
a comparator configured to receive the first output signal and the second output signal and generate a comparison signal;
a driver coupled to the comparator and configured to generate a drive signal based on at least information associated with the comparison signal; and
a current generator configured to receive the one or more output clock signals and generate a compensation current flowing out of the chip through the terminal based at least in part on the one or more output clock signals;

wherein:
the driver is further coupled to a first switch configured to receive the drive signal and affect a first current flowing through a primary winding coupled to a secondary winding;
the secondary winding is associated with at least an output voltage of a power converter, the power converter including the primary winding, the secondary winding, and an auxiliary winding, the auxiliary winding being coupled to the secondary winding; and
the input voltage is associated with at least the auxiliary winding and depends on at least the output voltage and the compensation current.

21. The system of claim 20 wherein the second output signal increases exponentially with time during a time period.

22. The system of claim 21 wherein: the drive signal is associated with a switching period corresponding to a switching frequency; and the compensation current is approximately inversely proportional to the switching period in magnitude, the time period being a part of the switching period.

23. A method for regulating an output voltage of a power converter, the method comprising:
receiving an input voltage;
sampling the input voltage;
holding the sampled input voltage;
generating a sampled-and-held voltage based at least in part on the sampled input voltage;
processing information associated with the sampled-and-held voltage and a threshold voltage;
generating a first output signal based on at least information associated with the sampled-and-held voltage and the threshold voltage;
generating a second output signal and one or more third output signals;
receiving the first output signal and the second output signal;
generating a comparison signal based at least in part on the first output signal and the second output signal;
receiving the comparison signal;
processing information associated with the comparison signal;
generating a drive signal based on at least information associated with the comparison signal to affect a first current flowing through a primary winding coupled to a secondary winding, the secondary winding being associated with at least an output voltage of a power converter and coupled to an auxiliary winding of the power converter;
receiving the one or more third output signals; and
generating a compensation current based at least in part on the one or more third output signals;
wherein:
the input voltage depends on at least the output voltage and the compensation current;
the second output signal starts to increase from a first magnitude at a first time;
the one or more third output signals represent a first time period during which the second output signal increases in magnitude; and
the compensation current decreases in magnitude in response to a second time period increasing, the second time period starting from the first time and ending at a second time when the second output signal becomes equal to the first output signal in magnitude.

24. The method of claim 23 wherein the second output signal increases exponentially with time during the first time period.

25. The method of claim 23 wherein the second output signal increases exponentially with time during the second time period.

26. The method of claim 23 wherein:
the drive signal is associated with a switching period corresponding to a switching frequency; and
the compensation current is approximately inversely proportional to the switching period in magnitude, the first time period and the second time period being parts of the switching period.

27. The method of claim 26 wherein the generating a compensation current based at least in part on the one or more third output signals includes performing a segmented curve fitting process so that the compensation current is approximately inversely proportional to the switching period in magnitude.

28. The method of claim 23 wherein the generating a second output signal and one or more third output signals includes:
receiving an input clock signal associated with an input clock period; and
generating one or more output clock signals corresponding to one or more output clock periods respectively, the one or more output clock signals being the one or more third output signals respectively, each clock period of the one or more output clock periods being equal to the input clock period multiplied by an integer larger than 1.

29. The method of claim 23, and further comprising:
receiving the drive signal;
wherein the generating a compensation current based at least in part on the one or more third output signals includes:
generating one or more control signals based at least in part on the one or more third output signals and the drive signal;
receiving the one or more control signals; and
generating the compensation current based at least in part on the one or more control signals.

30. The method of claim 29 wherein the generating the compensation current based at least in part on the one or more control signals includes:
generating a second current based at least in part on the one or more control signals;
processing information associated with the second current;
generating a filtered signal based on at least information associated with the second current;
processing information associated with the filtered signal; and
generating the compensation current based on at least information associated with the filtered signal.

31. The method of claim 30 wherein the generating a filtered signal based on at least information associated with the second current includes:
receiving the drive signal;
generating a fourth output signal based at least in part on the drive signal;
processing information associated with the fourth output signal; and
generating the filtered signal based on at least information associated with the second current and the fourth output signal.

32. The method of claim 31 wherein the fourth output signal is associated with a predetermined pulse width.

33. The method of claim 23 wherein:
the drive signal is associated with a switching period corresponding to a switching frequency; and
the compensation current is inversely proportional to the switching period in magnitude, the first time period and the second time period being parts of the switching period.

34. A method for regulating an output voltage of a power converter, the method comprising:
receiving an input voltage;
sampling the input voltage;
holding the sampled input voltage;
generating a sampled-and-held voltage based at least in part on the sampled input voltage;
processing information associated with the sampled-and-held voltage and a threshold voltage;
generating a first output signal based on at least information associated with the sampled-and-held voltage and the threshold voltage;
receiving an input clock signal associated with an input clock period;
generating a second output signal and one or more output clock signals based at least in part on the input clock signal, the one or more output clock signals corresponding to one or more output clock periods respectively, each clock period of the one or more output clock periods being equal to the input clock period multiplied by an integer larger than 1;
receiving the first output signal and the second output signal;
generating a comparison signal based at least in part on the first output signal and the second output signal;
receiving the comparison signal;
processing information associated with the comparison signal;
generating a drive signal based on at least information associated with the comparison signal to affect a first current flowing through a primary winding coupled to a secondary winding, the secondary winding being associated with at least an output voltage of a power converter and coupled to an auxiliary winding of the power converter;
receiving the one or more output clock signals; and
generating a compensation current based at least in part on the one or more output clock signals;
wherein the input voltage depends on at least the output voltage and the compensation current.

35. The method of claim 34 wherein the second output signal increases exponentially with time during a time period.

36. The method of claim 34 wherein:
the drive signal is associated with a switching period; and
the compensation current is approximately inversely proportional to the switching period in magnitude, the time period being a part of the switching period.

* * * * *